US006330492B1

(12) United States Patent
Wisniewski et al.

(10) Patent No.: US 6,330,492 B1
(45) Date of Patent: Dec. 11, 2001

(54) ROBOTIC FURNITURE TEXTURING

(75) Inventors: Joseph Wisniewski, Denver; Roger Jones, Hickory, both of NC (US)

(73) Assignee: Century Furniture Industries, Inc., Hickory, NC (US)

( * ) Notice: Subject to any disclaimer, the term of this patent is extended or adjusted under 35 U.S.C. 154(b) by 0 days.

(21) Appl. No.: 09/134,899

(22) Filed: Aug. 17, 1998

Related U.S. Application Data

(62) Division of application No. 08/890,792, filed on Jul. 11, 1997, now Pat. No. 5,987,217.

(51) Int. Cl.[7] .................................................. G06F 19/00

(52) U.S. Cl. ..................... 700/245; 144/134.1; 144/360; 144/135.2; 144/137; 144/114.1; 144/24.1; 269/21; 269/303; 29/559; 428/151

(58) Field of Search ......................... 700/245; 144/134.1, 144/360, 135.2, 137, 144.1, 117.1, 2.1, 363, 144.41, 123, 136.1, 326, 323; 29/559; 269/21, 303; 428/151

(56) References Cited

U.S. PATENT DOCUMENTS

| | | | | |
|---|---|---|---|---|
| 3,756,295 | * | 9/1973 | Halop | 144/4.1 |
| 4,116,248 | * | 9/1978 | Erwin | 144/24.1 |
| 4,207,936 | * | 6/1980 | Arbour | 144/360 |
| 4,338,052 | * | 7/1982 | Lockett | 409/206 |
| 4,372,357 | * | 2/1983 | Steiling | 144/114.1 |
| 5,493,767 | * | 2/1996 | Susnjara | 29/559 |

FOREIGN PATENT DOCUMENTS

WO 98/29224 * 7/1998 (WO) .

OTHER PUBLICATIONS

Matsumoto et al., Study on Surface Roughness and Gloss of Interior Design Materials, IEEE., p. 37, 1997.*

* cited by examiner

*Primary Examiner*—William A. Cuchlinski, Jr.
*Assistant Examiner*—McDieunel Marc
(74) *Attorney, Agent, or Firm*—Pillsbury Winthrop LLP

(57) ABSTRACT

A programmable furniture texturing robotic system includes a programmable multiaxis robot fixed to a support frame and a table fixed to a support frame such that they form an integrated unit and the programmable multiaxis robot has a furniture texturing tool unit attached to the end of the robot arm. The furniture texturing tool unit is attachable to and detachable from the arm of the robot and is either a furniture chattering tool unit or a furniture distressing multitool turret. The furniture chattering tool unit has a circular saw blade which produces surface chatter marks when it is dragged across the surface of a furniture part. The furniture distressing tool unit has a plurality of furniture distressing tools, each of which produce a plurality of furniture distress marks including simulated wood rot, worm holes, hatchet marks, rock marks, wood split marks, crooked vein lines, and cigarette burn marks.

13 Claims, 19 Drawing Sheets

ROBOTIC FURNITURE TEXTURING

This is a division of application Ser. No. 08/890,792, filed Jul. 11, 1997, now U.S. Pat. No. 5,987,217 issued Nov. 16, 1999.

BACKGROUND OF THE INVENTION

1. Field of the Invention

The present invention pertains to robotic furniture texturing, and more particularly to an apparatus and method of producing a plurality of furniture parts with substantially the same texture markings and to the plurality of furniture parts which have substantially the same texture marks.

2. Description of Related Art

Hand-crafted furniture has a desirable aesthetic appeal with many consumers. Similarly, many consumers find furniture which has picked up characteristic distress marks over time to be very desirable. Modern manufacturing methods produce furniture which does not have the aesthetically appealing surface texture markings such as those produced by hand-crafted methods or by distressing over periods of time.

This has led to manually texturing the surfaces of newly manufactured furniture to give the furniture the appearance of being hand-crafted and/or to impart the desirable appearance of being aged. The manual methods of texturing furniture have many disadvantages. It is time consuming and expensive to texture furniture manually. Furthermore, it is difficult to attain consistent and controllable results. Consequently, the manual methods of texturing furniture have the additional disadvantage of not consistently producing texturing effects which are aesthetically appealing.

SUMMARY OF THE INVENTION

Accordingly, it is an object of this invention to provide a furniture texturing system which produces consistent, controllable and repeatable surface texture features to furniture.

It is another object of this invention to provide a furniture texturing system which produces seemingly random yet aesthetically pleasing patterns of distress marks on various surfaces of pieces of furniture in a consistent, controllable and repeatable manner.

It is another object of this invention to provide a furniture texturing system which produces aesthetically pleasing chattering surface texture features in a consistent, controllable and repeatable manner.

It is another object of this invention to provide a furniture texturing system in which a large variation of furniture surface texture features can be produced with a minimal amount of retooling of manufacturing equipment.

It is another object of this invention to provide furniture texturing tools to be used in a furniture texturing apparatus which produces consistent, controllable and repeatable furniture surface texture features which are aesthetically pleasing.

It is another object of this invention to provide a method of producing aesthetically pleasing surface texture features to furniture in a consistent, controllable and repeatable manner.

It is still another object of this invention to provide a plurality of furniture parts which have substantially the same aesthetically pleasing, consistent, controllable and repeatable surface texture features.

Still another object of this invention is to provide furniture parts with consistent and controllable surface chattering texture marks.

The above and related objects of this invention are realized by providing a programmable furniture texturing robotic system which can be programmed to produce aesthetically pleasing furniture surface textures in a consistent, controllable and repeatable manner. The preferred embodiment of this invention has a programmable robot with a furniture texturing tool unit attached to a tool end of the robot arm. It is desirable for the furniture texturing tool unit to be able to produce a large variety of furniture surface-texture features to minimize the requirement of having to change the furniture texturing tool unit. The furniture texturing robot of this invention has a large number of degrees of freedom and high precision for positioning furniture texturing tools of the furniture texturing tool unit at desired locations. In addition, the furniture texturing robot is capable of moving the furniture texturing tools across the furniture surface in substantially the desired motion.

In a preferred embodiment of this invention, there are two types of furniture texturing tool units. One furniture texturing tool unit is a furniture chattering tool unit which produces a plurality of furniture chattering effects. The other furniture texturing tool unit is a furniture distressing tool unit. Although the preferred embodiment has separate tool units for furniture chattering and furniture distressing, alternative embodiments include furniture texturing tool units which produce both furniture chattering and furniture distressing effects.

The furniture chattering type of surface texturing is produced with a circular saw blade which is dragged across a surface region of the furniture part. As the circular saw blade is dragged across a surface region of the furniture part, it produces crescent shaped undulations which are first shallow, increase to a maximum depth, and then abruptly return to approximately the original surface or shallow depth. These undulations can be produced to be substantially periodic over selectable small or large regions of the surface of a furniture part, or can be made to be aperiodic or random. The controllability of the robot combined with the furniture chattering tool unit of the preferred embodiment, or a combined tool unit of an alternative embodiment, permit the user to produce furniture chatter patterns which cannot reasonably be produced by hand or by other prior art methods.

The furniture distressing tool unit has a plurality of furniture distressing tools. Each of the furniture distressing tools can produce a plurality of furniture distress marks. The robot is programmed such that a large variety of furniture distress marks are produced without the need to change the furniture distressing tool unit. In an alternative embodiment, the furniture distressing tool unit includes a furniture chattering tool.

In the preferred embodiment, the furniture distressing tool unit has four different furniture distressing tools. A distressing router tool is used to produce a plurality of furniture distress marks which includes simulated crooked vein lines, uneven plank cuts and cigarette burn marks. A descalar distressing tool produces a plurality of furniture distress marks which include marks which simulate worm hole marks and rot marks. A distressing rock tool produces a plurality of indentations in the surface of the furniture which simulate rock marks. The hatchet distressing tool produces a plurality of furniture distress marks which include distress marks which simulate hatchet marks and wood split marks. The wood split marks are typically along the edge of a furniture part.

The method of texturing surfaces of furniture according to this invention includes putting a piece of wood, such as a furniture part, onto the table of the programmable furniture texturing robotic system such that it can be held while the user programs the furniture texturing robot to produce a sequence of furniture texture features. Once the user has programmed the robot to perform a sequence of furniture texturing operations which result in aesthetically pleasing furniture texturing features, the program can be used repeatedly to produce substantially the same furniture texture features on a plurality of similar furniture parts. Additional programs can be developed such that a plurality of such programs are available for use at any given time.

Finally, this invention includes furniture in which a plurality of items of furniture have surface texture features which are aesthetically pleasing and give the appearance of being unique. However, a plurality of items of furniture have surface texture features which are substantially the same even though they have the desirable appearance of being unique. This invention also includes furniture parts which have chattering-type surface textures which cannot reasonably be produced by previously known methods and devices.

BRIEF DESCRIPTION OF THE DRAWINGS

The file of this patent contains at least one color photograph. Copies of this patent with color photographs will be provided by the Patent and Trademark Office upon request and payment of the necessary fee.

DETAILED DESCRIPTION OF THE PREFERRED EMBODIMENTS

Figure 1:
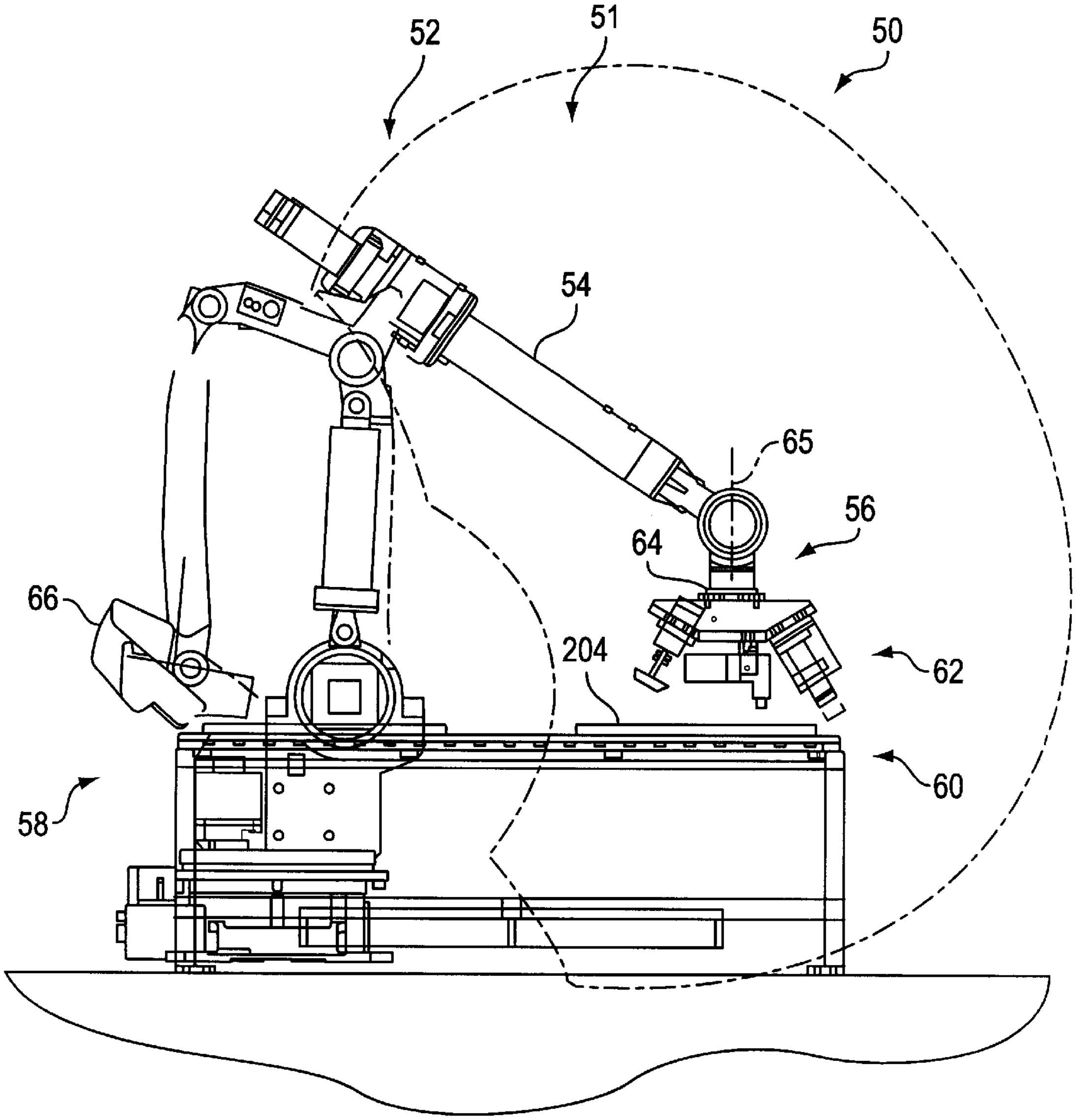
FIG. 1 is a side view of the programmable furniture texturing robotic system of the present invention.

The programmable furniture texturing robotic system of the present invention is designated generally by the reference numeral 50 in FIG. 1. The programmable furniture texturing robotic system 50 includes a furniture texturing robot 51 which includes a programmable multiaxis robot 52 having a tool arm 54. The tool arm 54 has a tool end 56. A suitable programmable multiaxis robot is a MOTOMAN K120 six-axis robot commercially available from Spearhead Automated Systems Inc. having a YASNAC MRC controller and a robot tolerance of ±0.1 mm. The MOTOMAN robot comes with dual 32 bit RISC processors that allow for smooth path motion, speed, accuracy and a 120 kg payload capacity. The MOTOMAN robot comes equipped with a teaching, editing and programming pendant with one touch programming execution. However, other robots may be selected without departing from the scope or spirit of the invention.

The programmable multiaxis robot 52 is attached to a support frame 58. A table 60 is attached to the support frame 58 such that the programmable multiaxis robot 52, support frame 58, and table 60 form an integrated unit to maintain proper alignment of the tool end 56 of the arm 54 of the programmable multiaxis robot 52. Preferably, the table 60 is a vacuum table which holds the furniture part in position while the programmable multiaxis robot produces texture markings on the furniture part. Vacuum tables for holding both flat and curved furniture parts in place are known in the art of furniture manufacturing for uses other than a programmable furniture texturing robotic system.

The programmable furniture texturing robotic system 50 has a furniture texturing tool unit 62 fixedly attached to the tool end 56 of the tool arm 54. Preferably, the furniture texturing tool unit 62 is fixedly attached to an attachment plate 64 at the tool end 56 of the tool arm 54. The attachment plate 64 is rotatable about an axis 65 substantially perpendicular to the attachment plate 64. Preferably, the attachment plate 64 can be rotated by substantially 360° about the axis 65.

The programmable multiaxis robot has a counter weight 66 attached at a distance from the tool end 56 of the tool arm 54 to substantially cancel a primary component of torque on the tool arm 54 generated by the furniture texturing tool unit 62. One skilled in the art would recognize that a robot other than a MOTOMAN K120 six-axis robot may require a counterweight and mounting configuration different from that of the preferred embodiment.

Figure 2A:
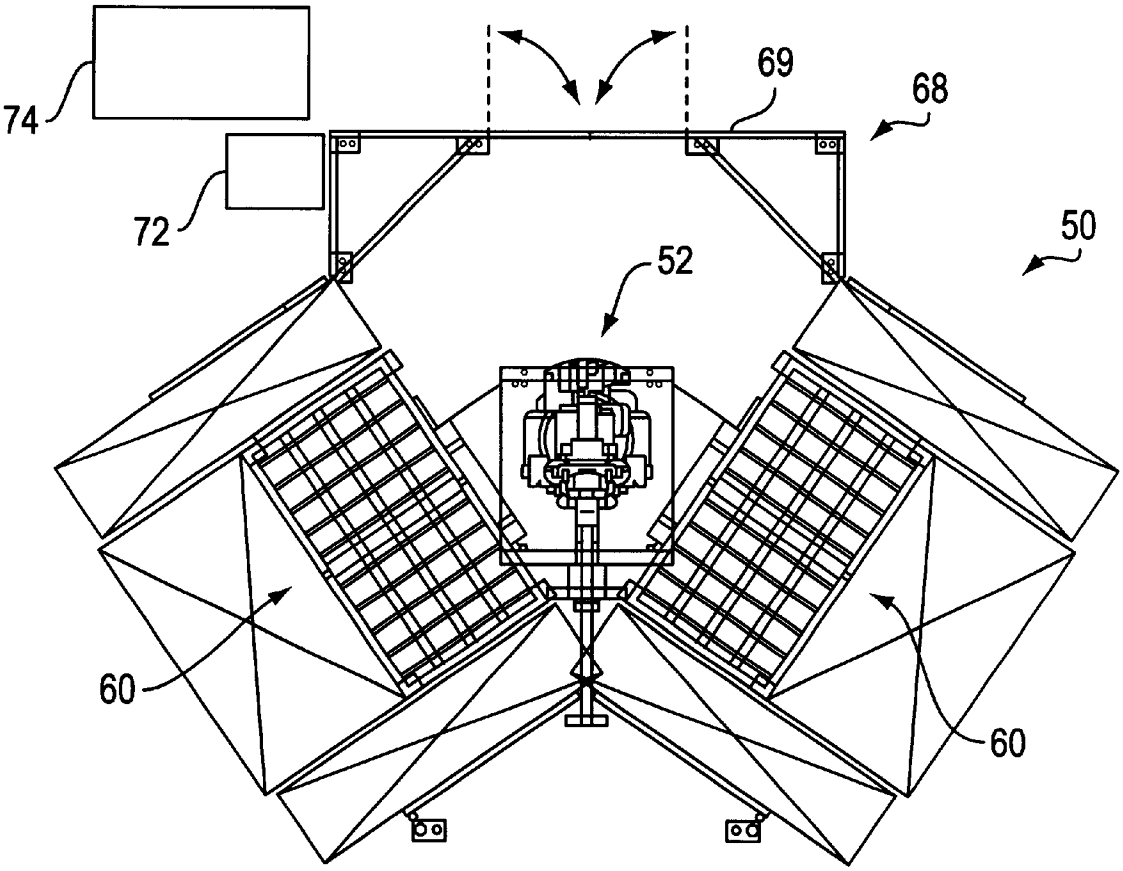
FIG. 2A is a top view of the programmable furniture texturing robotic system of the present invention.
Figure 2B:
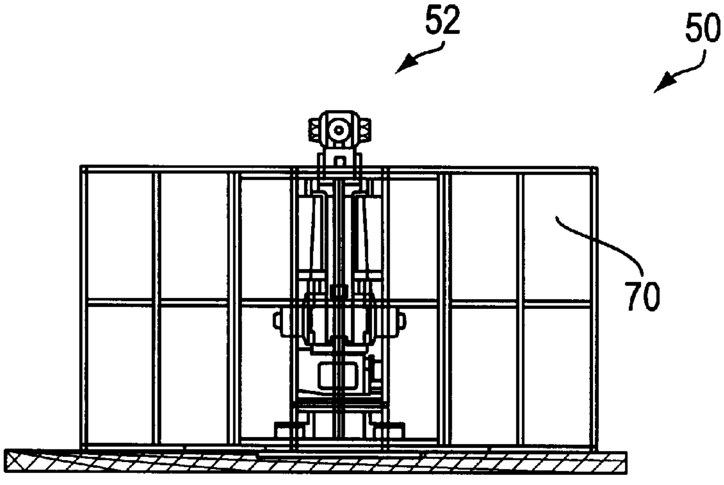
FIG. 2B is a front elevation view of the programmable furniture texturing robotic system of the present invention which also illustrates protective shielding.

A top view of the programmable furniture texturing robotic system for a preferred embodiment is illustrated in FIG. 2A. This preferred embodiment has two tables 60, and a work cell 68. The work cell 68 preferably has a frame 69 made from 8 in×6 in rectangular steel tubing. In the example of FIG. 2A, the work cell 68 is 25 ft 2 in×17 ft 3 in. The work cell 68 is further enclosed by safety glass such as LEXAN guarding 70, which can best be seen illustrated in FIG. 2B. In the example of FIG. 2A, a YASNAC controller 72 and vacuum pump 74 are disposed proximate to the work cell 68. An air supply of 80 psi dried is suitable in this example.

Figure 3:
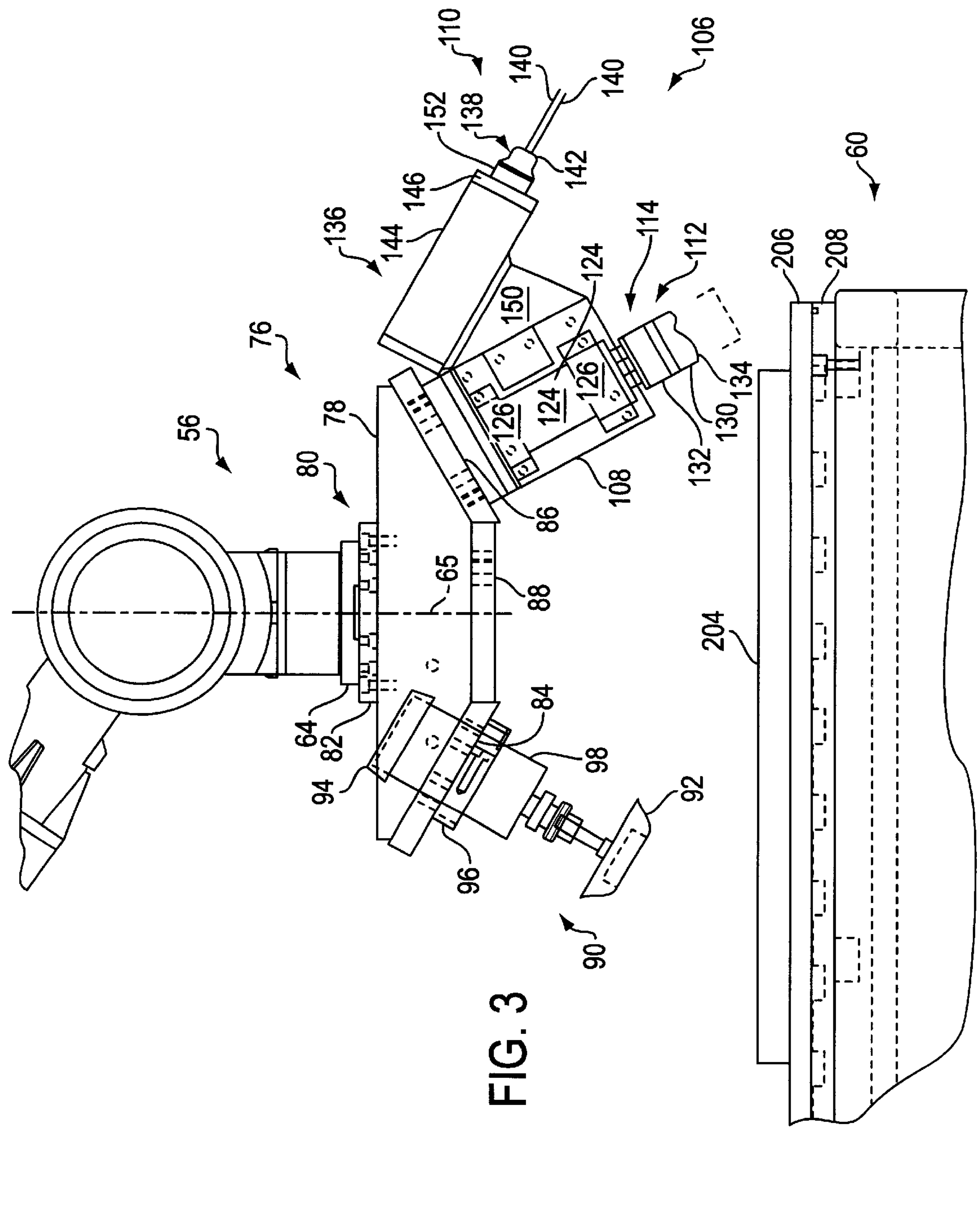
FIG. 3 is a view of the furniture distressing tool unit according to a preferred embodiment of the invention.

The preferred embodiment of this invention has two furniture texturing tool units 62 (FIG. 1). The user selects one of the two furniture texturing tool units 62 and attaches it to the attachment plate 64 of the programmable multiaxis robot 52. The specific furniture texturing tool unit 62 illustrated in FIG. 1 is an embodiment of a furniture distressing tool unit which is different from the preferred embodiment. Other alternative embodiments are within the scope and spirit of the invention, e.g., a furniture texturing tool unit 62 may include both furniture distressing and furniture chattering tools. FIG. 3 shows a preferred embodiment of the furniture distressing tool unit 76. The furniture distressing tool unit 76 has a multitool turret 78 which has a tool end attachment region 80. Preferably, the tool end attachment region 80 has a multitool attachment plate 82 attached at one face to the multitool turret 78 and at an opposing face to the attachment plate 64. A suitable material for the multitool attachment plate 82 and the multitool turret 78 is aluminum. The multitool turret 78 has a plurality of furniture distressing tool attachment regions, such as 84, 86, and 88. A greater or lesser number of furniture distressing tool attachment regions may be selected without departing from the spirit or scope of the invention. Tools other than furniture distressing tools, such as furniture chattering tools, may be attached at the furniture distressing attachment regions.

Figure 4A:
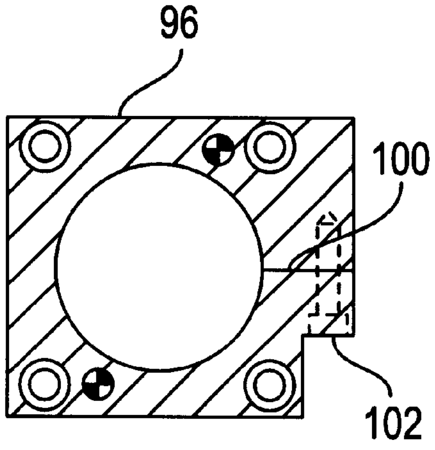
FIG. 4A is a view of a router bracket according to a preferred embodiment of the invention.
Figure 4B:
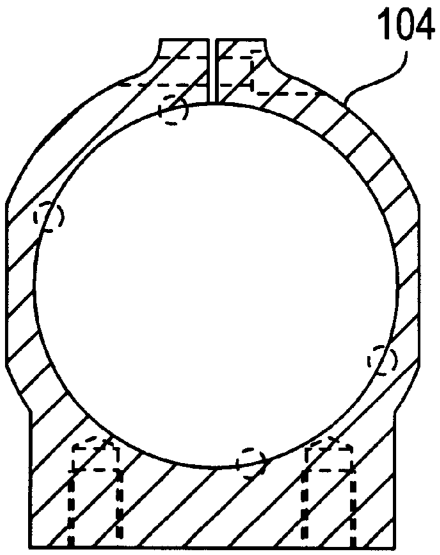
FIG. 4B is a view of an alternative embodiment of a router bracket for an embodiment of the invention.

In the preferred embodiment, the furniture distressing tool unit 76 includes a plurality of furniture distressing tools attached to the multitool turret 78. A suitable material for the multitool turret is aluminum. In the preferred embodiment, a first furniture distressing tool is a router distressing tool 90. The distressing router 90 has a router bit 92 which is selectable according to the desired texturing effect. The distressing router 90 has an end plate 94 and a router mounting packet 96 to attach router 98 to the multitool turret 78. A suitable router 98 is available from Porter Cable (Model 6902). The router bracket 96 is preferably constructed from aluminum such that it defines a circular hole therethrough for accommodating the router 98, as one may view more clearly in FIG. 4A. A saw cut gap 100 and mechanical fastener 102 permit the bracket to be clamped tightly around a selected circumferential region of the router 98. Alternatively, a bracket 104 may be used instead of bracket 96 (see FIG. 4B).

Figure 5A:
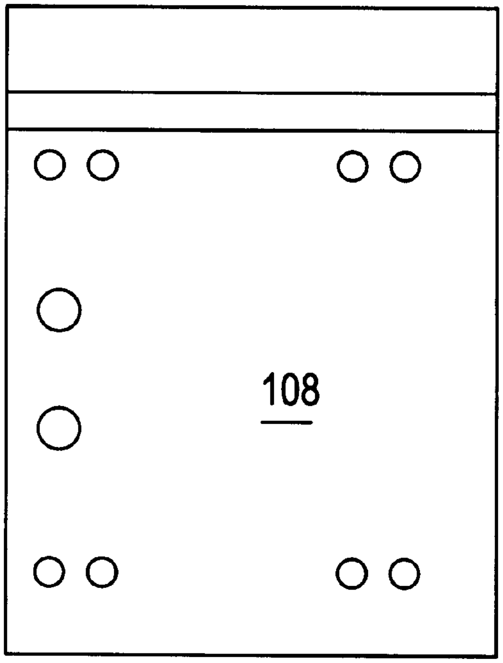
FIG. 5A is a front view of a compound furniture distressing tool attachment bracket according to a preferred embodiment of the invention.
Figure 5B:
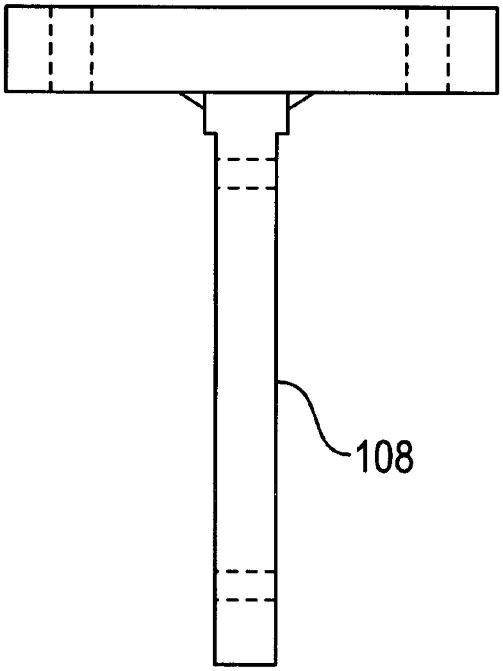
FIG. 5B is a side view of a compound furniture distressing tool attachment bracket according to a preferred embodiment of the invention.

The furniture distressing tool unit 76 (FIG. 3) includes a compound distressing tool unit 106 which has a plurality of furniture distressing tools. The compound furniture distressing tool unit 106 has a compound furniture distressing tool attachment bracket 108 which preferably attaches to a furniture distressing tool attachment region 86 by mechanical fasteners. One can view the compound furniture distressing tool attachment bracket 108 in FIGS. 5A and 5B. A plurality of furniture distressing tools are attached to the compound furniture distressing tool attachment bracket 108 (see FIG. 3). In the preferred embodiment, a descalar distressing tool 110, a rock distressing tool 112 and a hatchet distressing tool 114 are attached to the compound furniture distressing tool attachment bracket 108. The hatchet distressing tool 114 is immediately behind the rock distressing tool 112 in FIG. 3. The hatchet distressing tool 114 and rock distressing tool 112 are more clearly visible from a side view illustrated in FIG. 6.

Figure 7A:
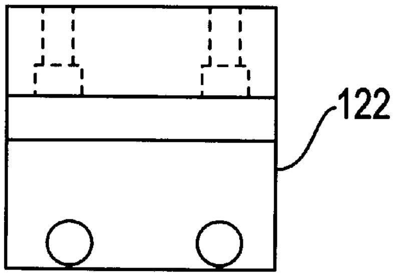
FIG. 7A is a front view of a hatchet holder according to a preferred embodiment of the invention.
Figure 7B:
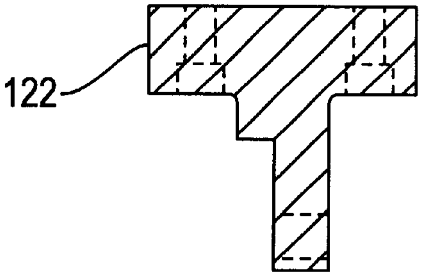
FIG. 7B is a side view of a hatchet holder according to a preferred embodiment of the invention.
Figure 8A:
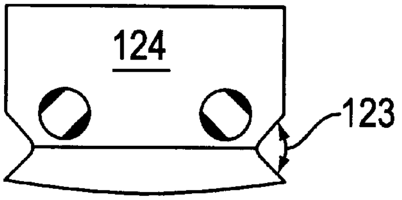
FIG. 8A is a front view of a distressing hatchet according to a preferred embodiment of the invention.
Figure 8B:
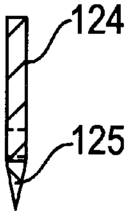
FIG. 8B is a side view of a distressing hatchet according to a preferred embodiment of the invention.

The hatchet distressing tool 114 has an expansion component 116 attached to compound furniture distressing tool attachment bracket 108 by hatchet attachment bracket 118 mechanically fastened to the compound furniture distressing tool attachment brackets 108. Preferably, the expansion component is an air cylinder selected from conventionally known air cylinders and is attached to a variable pressure air supply unit in a conventional manner (not shown). A suitable commercially available air cylinder is a NUMATICS ACTUATOR S2FM-02A1D-CAA2. Similarly, in a conventional manner, a slidable member 120 such as a piston is attached to a hatchet holder 122. The hatchet holder 122 is attached to the distressing hatchet 124'. (One may view the hatchet holder 122 more clearly in FIGS. 7A and a preferred embodiment of the distressing hatchet 124 in FIGS. 8A and 8B.) A suitable material for the distressing hatchets 124 and 124' is tool steel. A first angle 123 of approximately 90° and a second angle 125 of approximately 20° was found to be suitable for the distressing hatchet 124'.

Figure 6:
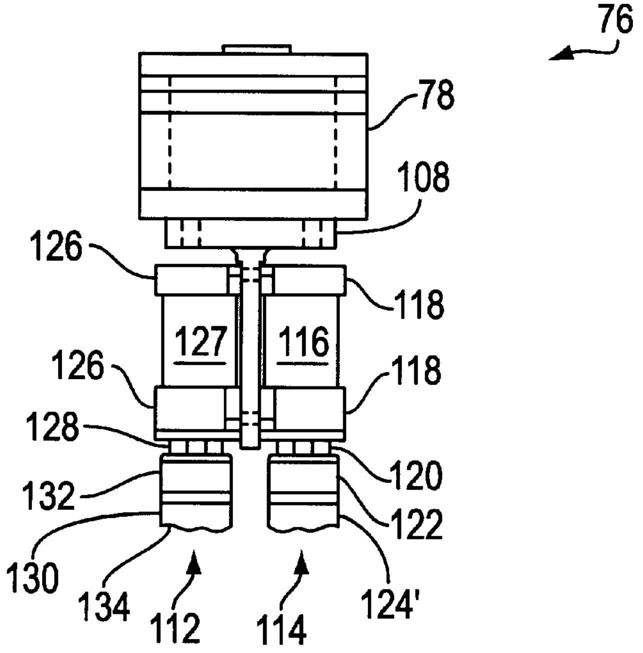
FIG. 6 is a side view of a furniture distressing tool unit according to a preferred embodiment of the invention with the scalar distressing tool and router distressing tool removed to provide a clearer view of the rock distressing tool and hatchet distressing tool.

In the preferred embodiment, the operating elements of the rock distressing tool 112 are similar in construction to the hatchet distressing tool 114 (FIG. 6). The rock distressing tool has an expansion component 127 which is preferably, for example, one or more conventional pneumatic air cylinders. The expansion component 127 is attached to a variable pressure air source (not shown). The expansion component 127 is preferably attached to the compound furniture distressing tool attachment bracket 108 by the air cylinder brackets 126 with mechanical fasteners. The rock distressing tool has a slidable member 128 which is part of a conventional air cylinder. The distressing rock element 130 is itself attached to a rock spacer 132, which in turn is attached to the slidable member 128. The distressing rock element 130 includes a distressing face 134, perhaps best seen in FIGS. 3, 6 and 10B, that has a plurality of rock-like shapes including convex and concave surface regions as well as sharp and rounded areas to replicate actual rock-like effects on the article of furniture.

Figure 9A:
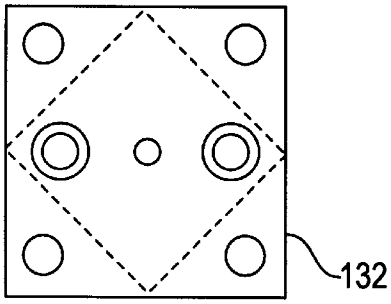
FIG. 9A is a top view of a rock spacer according to a preferred embodiment of the invention.
Figure 9B:
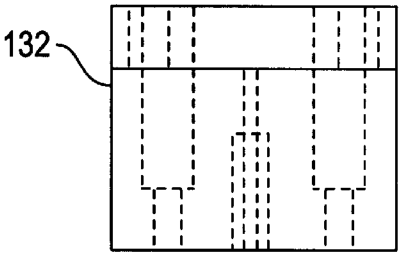
FIG. 9B is a front view of a rock spacer according to a preferred embodiment of the invention.
Figure 10A:
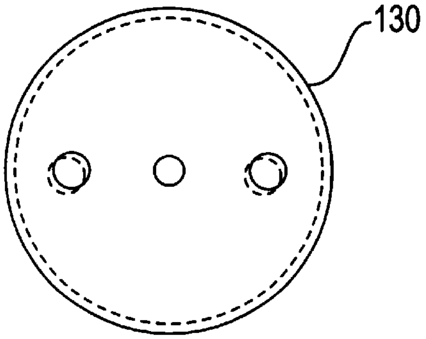
FIG. 10A is a top view of a distressing rock according to a preferred embodiment of the invention.
Figure 10B:
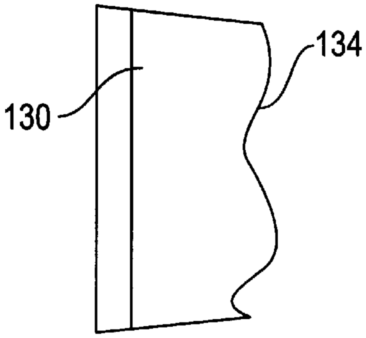
FIG. 10B is a side view of a distressing rock according to a preferred embodiment of the invention.

The plurality of rock-like shapes are selectable in accordance with the desired furniture distressing effect. The rock spacer 132 is also illustrated in FIGS. 9A and 9B. A suitable material for the rock spacer 132 is aluminum. FIGS. 10A and 10B show an enlarged view of the distressing rock element 130. A suitable material for the distressing rock element 130 is steel.

As one may see illustrated in FIG. 3, the descalar distressing tool 110 has a descalar bracket 136 attached to the compound furniture distressing tool attachment bracket 108, preferably by mechanical fasteners. The descalar distressing tool 110 includes a descalar 138, similar to a conventional descalar, but modified such that it has two descalar pins 140 rather than a large number of descalar pins as in a conventional descalar used in the metal industry for removing burs from metal parts. In addition, the modified descalar pins 140 are sharpened. The descalar pins 140 are typically attached at an attachment end 142 of the descalar 138. Descalars are also known as jet chisels. A suitable commercially available descalar is the jet chissel by Nittokohkico Ltd. (Model JT-20). The descalar 138 has conventional pistons which move the descalar pins 140 in a back-and-forth motion along the longitudinal direction of the descalar 138. The motion of the descalar pins 140 typically have an amplitude of about, for example, 0.2 to 0.5 inches but greater or lesser movement is contemplated. The attachment end 142 of the descalar 138 is typically circular as viewed end-on and the descalar pins 140 are typically attached off center. The attachment end 142 typically rotates about a center axis of the circular attachment end 142 in operation so that pins 140 can move inwardly, outwardly, and/or rotate or incorporate a plurality of these motions, as well as a variety of angular positions relative to the furniture surface.

Figure 11:
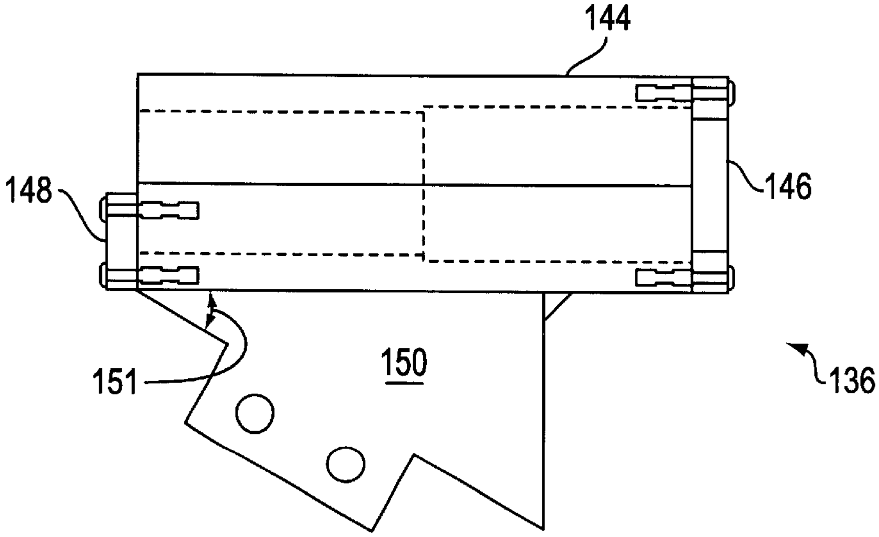
FIG. 11 is a side view of a descalar bracket according to a preferred embodiment of the invention.

FIG. 11 illustrates a more detailed view of the descalar bracket 136. The descalar bracket 136 has a tube 144 which is preferably aluminum. Brackets 146 and 148 are preferably attached to aluminum tube 144 by mechanical fasteners. Bracket 150 is preferably attached to aluminum tube 144 by welding. An angle 151 of approximately 30° is suitable for the bracket 150. Aluminum is a suitable material for brackets 146, 148 and 150. The bracket 150 attaches to the compound furniture distressing tool attachment bracket 108, preferably by mechanical fasteners (FIG. 3). As one can see illustrated in FIG. 3, the descalar distressing tool 110 also has a descalar spacer 152.

Although the preferred embodiment of the furniture distressing tool unit 76 has four furniture distressing tools, the furniture distressing tool unit 76 is not limited to that exact number. A greater or lesser number of distressing tools is within the scope and spirit of the invention.

Figure 12:
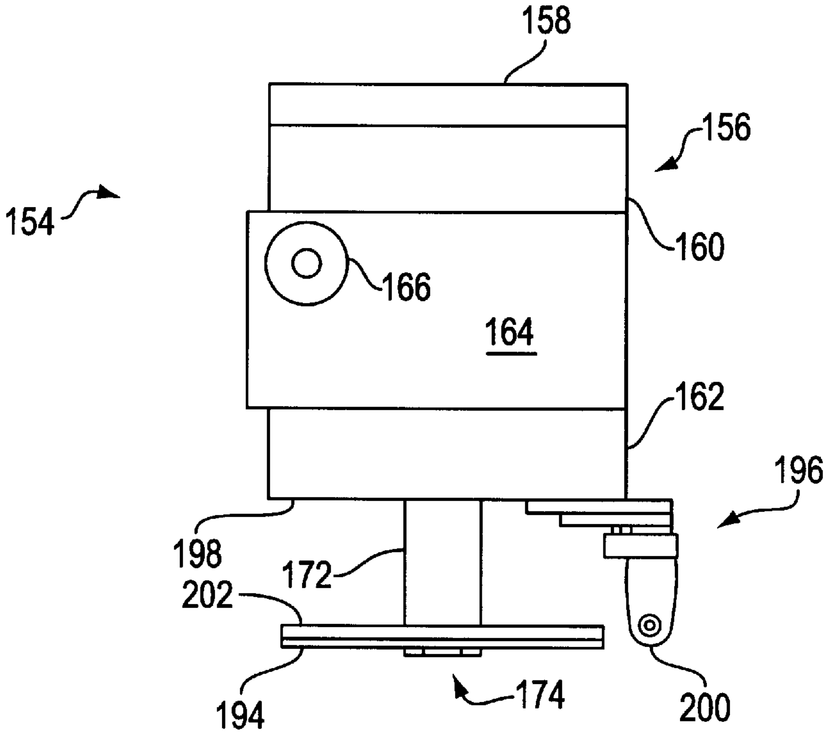
FIG. 12 is a side view of a furniture chattering tool unit according to a preferred embodiment of the invention.
Figure 13:
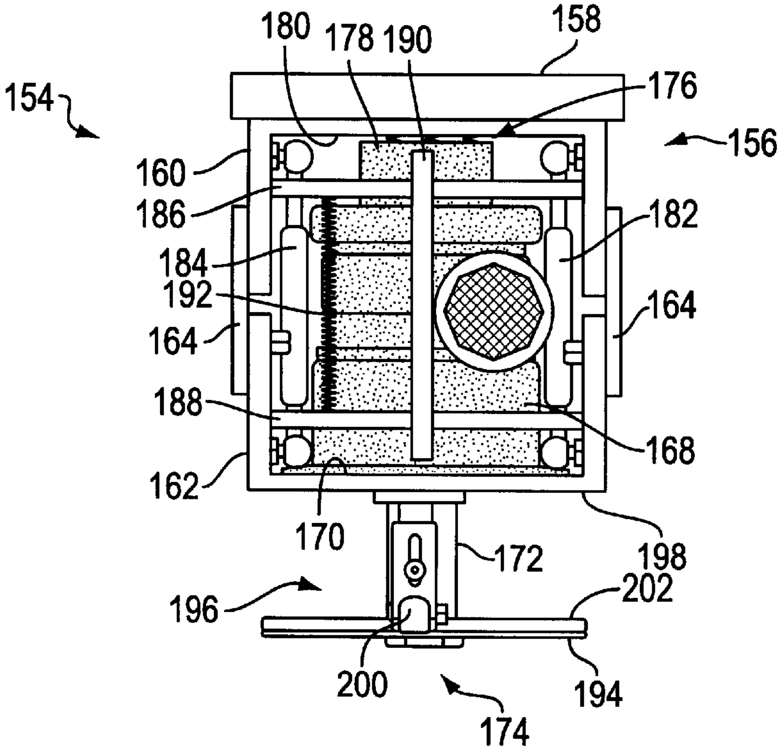
FIG. 13 is a front view of a furniture chattering tool unit according to a preferred embodiment of the invention as one would view from the direction of motion of the furniture chattering tool unit.

The second furniture texturing tool unit of the preferred embodiment is a furniture chattering tool unit 154 illustrated in FIGS. 12 and 13. The furniture chattering tool unit 154 has a support frame 156 with an attachment region 158 to attach and detach the furniture chattering tool unit 154 to the attachment plate 64 of the programmable multiaxis robot 52 (see FIG. 1 for an illustration of the attachment plate 64). The support frame 156 has an upper frame portion 160 and a lower frame portion 162. Preferably, as one may best view in FIG. 13, a pair of Gibb plates 164 are attached to lower frame portion 162 by mechanical fasteners and slidably attached to upper frame portion 160 by bearings 166. (See FIG. 12 for an illustration of the bearings 166 on one of the two Gibb plates 164. The bearings 166 on the other Gibb plate 164 are not shown.) A motor 168 is disposed within the support frame and in contact with a bottom surface 170 of the lower support frame 162. The motor 168 is preferably an air operated motor and is selectable from conventional motors. A model 8AM-NRV-76 6ZC-94 commercially available from Gaft Manufacturing Corp. is suitable.

The motor 168 has a drive shaft 172 which extends in a direction from the attachment end 158 of the support frame 156 to a furniture part end 174 of the furniture chattering tool unit 154.

In the preferred embodiment, a plurality of compression springs 176 are disposed between a top surface 178 of the motor 168 and an inner surface 180 of the upper frame portion 160 such that the compression springs 176 exert a force tending to increase the distance between the motor 168 and the inner surface 180 of the upper frame portion 160 when the compression springs 176 are in a compressed state. A gas shock 182 is attached at one lateral side of the support frame 156 such that one end is attached to the upper frame portion 160 and the other end is attached to the lower frame portion 162. Similarly, another gas shock 184 is attached at the opposite lateral side of the support frame 156 such that one end is attached to the upper frame portion 160 and the other end is attached to the lower frame portion 162. The upper frame portion 160 has a cross support member 186. The lower support frame portion 162 has a cross support member 188. A suitable material for the cross support members 186 and 188 is steel. A support member 190 is slidably attached between the cross support member 186 of the upper frame portion 160 to the cross support member 188 of the lower frame portion 162. An expansion spring 192 has one end attached to the cross support member 186 of the upper frame portion 160 and the other end attached to the cross support member 188 of the lower frame portion 162. The furniture chattering tool unit 154 has a saw blade 194 attached substantially perpendicularly to the drive shaft 172 and, substantially at its center point.

The furniture chattering tool unit 154 also has an adjustable roller bearing unit 196 fixed to the a bottom surface 198 of the support frame 156. The roller bearing unit 196 extends substantially parallel to the drive shaft 172 of the motor 168 and has a roller bearing 200 at a furniture part end 174 of the furniture chattering tool unit 154. A plate 202 is fixedly attached between the saw blade 194 and the drive shaft 172 such that it is substantially parallel to the saw blade 194.

In operating the programmable furniture texturing robotic system 50 according to the present invention, one first selects a furniture texturing tool unit 62 from a plurality of possible types of furniture texturing tool units. In the preferred embodiment, one selects either a furniture distressing tool unit 76 or a furniture chattering tool unit 154 and attaches it to the attachment plate 64 of the tool end 56 of the tool arm 54 of the programmable multiaxis robot 52. Although the preferred embodiment has two different furniture texturing tool units 62, a lesser number or a greater number of tool units 62 are within the scope and spirit of the invention. Also, an alternative embodiment may include both furniture distressing and chattering tools on the same furniture texturing tool unit.

The user then fixes a wood part, such as a furniture part 204, to table 60 (see FIG. 3). Preferably, the table 60 is a vacuum table adapted from vacuum tables known in the art for furniture manufacturing. For flat parts, a pod 206 is placed on the vacuum table and the flat part is placed on the pod 206. For furniture parts with curved surfaces, and irregular shapes, a mold (not shown) is placed on top of the vacuum table. The mold may define openings to provide a surface with a pressure lower than atmospheric pressure such that the curved or irregular furniture part is held to the surface due to the vacuum. Alternatively, or in combination thereof, the curved or irregular furniture part may be clamped or otherwise fastened to the mold.

The user then programs the programmable furniture texturing robot 51 to perform a predetermined sequence of furniture texturing operations. The MOTOMAN K120 robot is suitable since it has a teach mode and a teaching input device in which the user uses the teaching input device to program all of the robot's motions. The user positions the desired furniture texturing tool at a desired point in contact with, or proximate to, the surface point of the furniture part 204. The configuration of the furniture texturing robot 51 is recorded as a step in the program. The user then selects another point of the surface of the furniture part 204 such that the desired furniture texturing tool is in contact with, or approximate to, the selected point. The MOTOMAN K120 robot also permits linear and circular interpolation between selected points. The user repeats this process such that the desired furniture texturing marks are produced at the desired locations on the surface of the furniture part.

After the user completes the program of all of the robot motions, preferably in a teaching mode of a programmable multiaxis robot 52, the program is ready to be used in production runs to produce the selected furniture texturing marks on a plurality of furniture parts. In a production run, a furniture part is secured to a table 60. It is suitable to secure the furniture part in the production run in the same way as described above for securing a wood part, or a furniture part, to a table 60 for programming the furniture texturing robot 51. The programmable multiaxis robot 52 of the preferred embodiment is then run through the predetermined sequence of furniture texturing operations which the user programmed during the programming step. The furniture texturing robot 51 will thereby substantially produce the predetermined furniture texturing marks on the surface of the furniture part.

After the furniture texturing robot 51 has completed the predetermined sequence of furniture texturing operations, the user removes the furniture part 204 from the table 60. The user then disposes another furniture part 204 on the table 60 in substantially the same manner as described above. The programmable multiaxis robot 52 is then run through the predetermined sequence of furniture texturing operations, thus producing a second furniture part with substantially the same furniture texturing marks as in the first mentioned furniture part. This process is then repeated to produce a desired number of furniture parts with substantially the same texture marks.

The programmable furniture texturing robotic system 50 is not limited to a single table 60. In the preferred embodiment, the programmable furniture texturing robotic system 50 has two substantially identical tables 60. This permits a user, either manually or with a suitable apparatus, to remove the textured furniture part and to replace it with an untextured part while the furniture texturing robot 51 runs through the predetermined sequence of furniture texturing operations on a furniture part on the other table 60.

In order to produce distress marks on a furniture part, the user selects a furniture distressing tool unit. In a preferred embodiment of the invention, the furniture distressing tool unit 76 is selected to produce furniture distress marks. Each of the plurality of furniture distressing tools of the furniture distressing tool unit 76 produce a plurality of furniture distress marks.

FIG. 3 illustrates a furniture distressing router 90 proximate to a flat furniture part 204. The flat furniture part 204 is disposed on a pod plate 206 which, in turn, is disposed on the top surface of the table 60. In this case, the table 60 is a vacuum table with a top aluminum vacuum plate 208.

Figure 14:
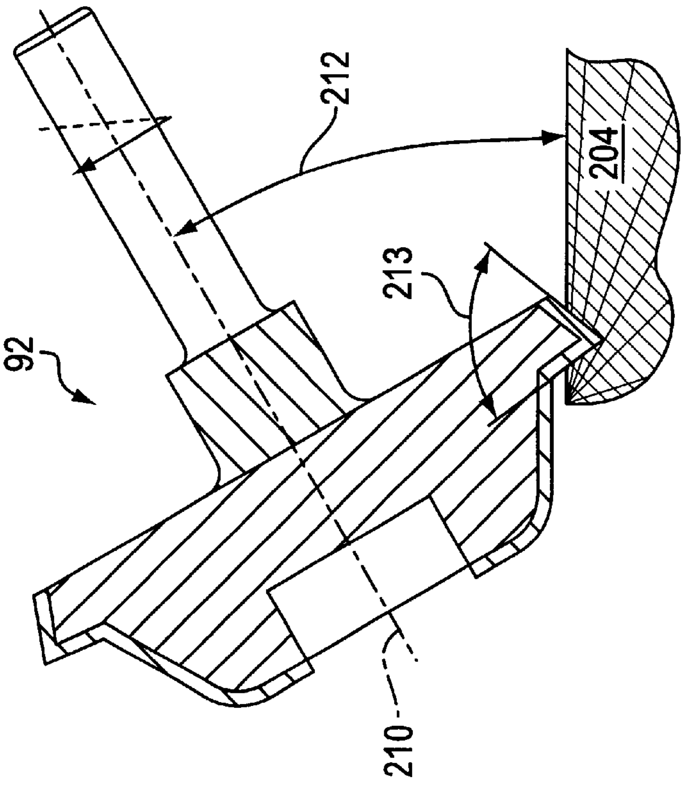
FIG. 14 is a router bit according to a preferred embodiment of the invention illustrating the production of one type of furniture distress mark.
Figure 15:
FIG. 15 shows a surface of a furniture part with surface texturing produced according to a preferred embodiment of the invention including uneven cut lines.
Figure 16:
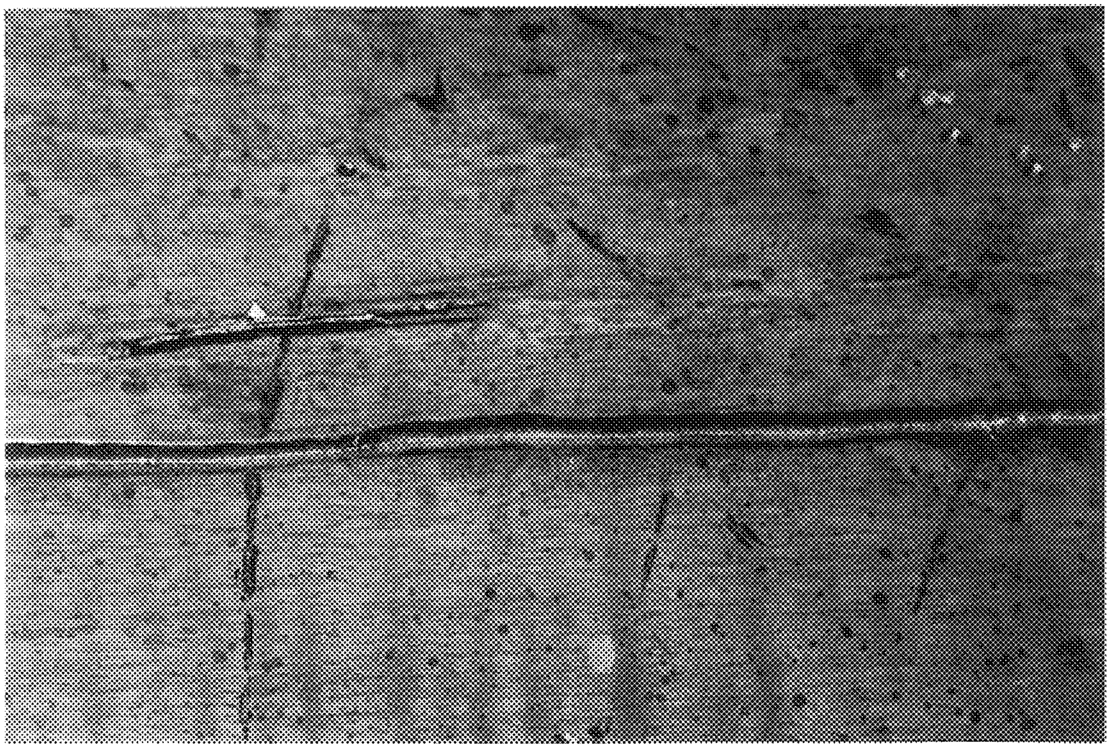
FIG. 16 shows a surface of a furniture part with surface texturing produced according to a preferred embodiment of the invention including uneven cut lines across the center of the figure.
Figure 17:
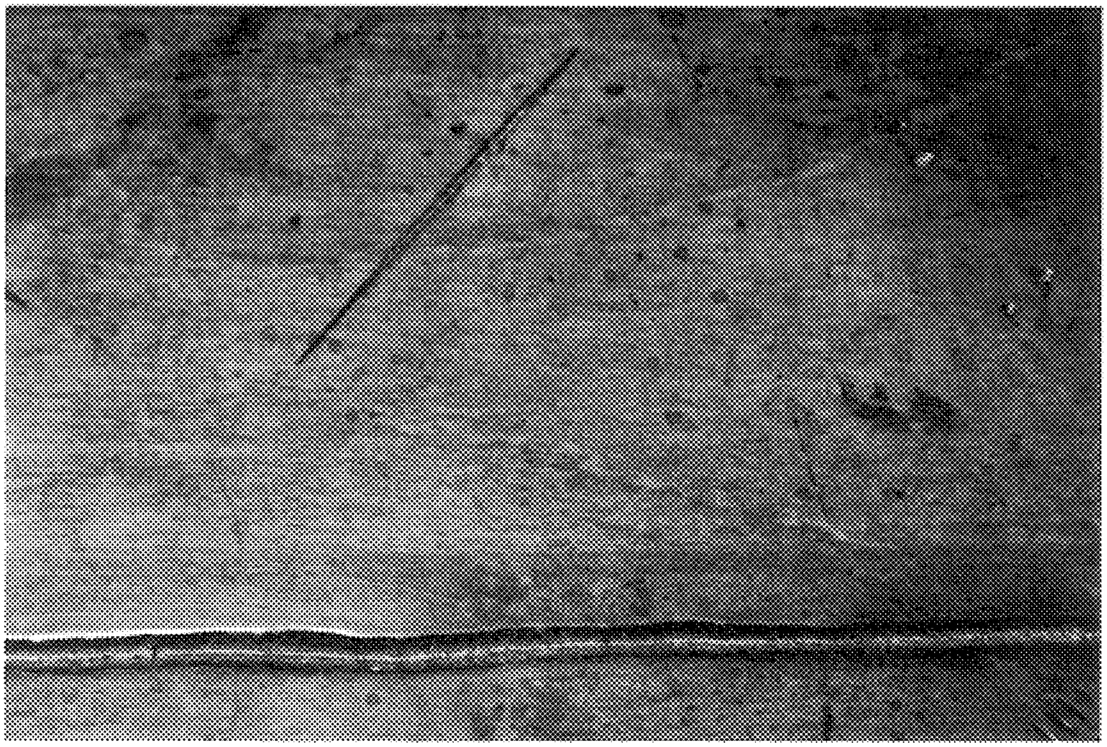
FIG. 17 shows a surface of a furniture part with surface texturing produced according to a preferred embodiment of the invention including uneven cut lines across the center of the figure.
Figure 18:
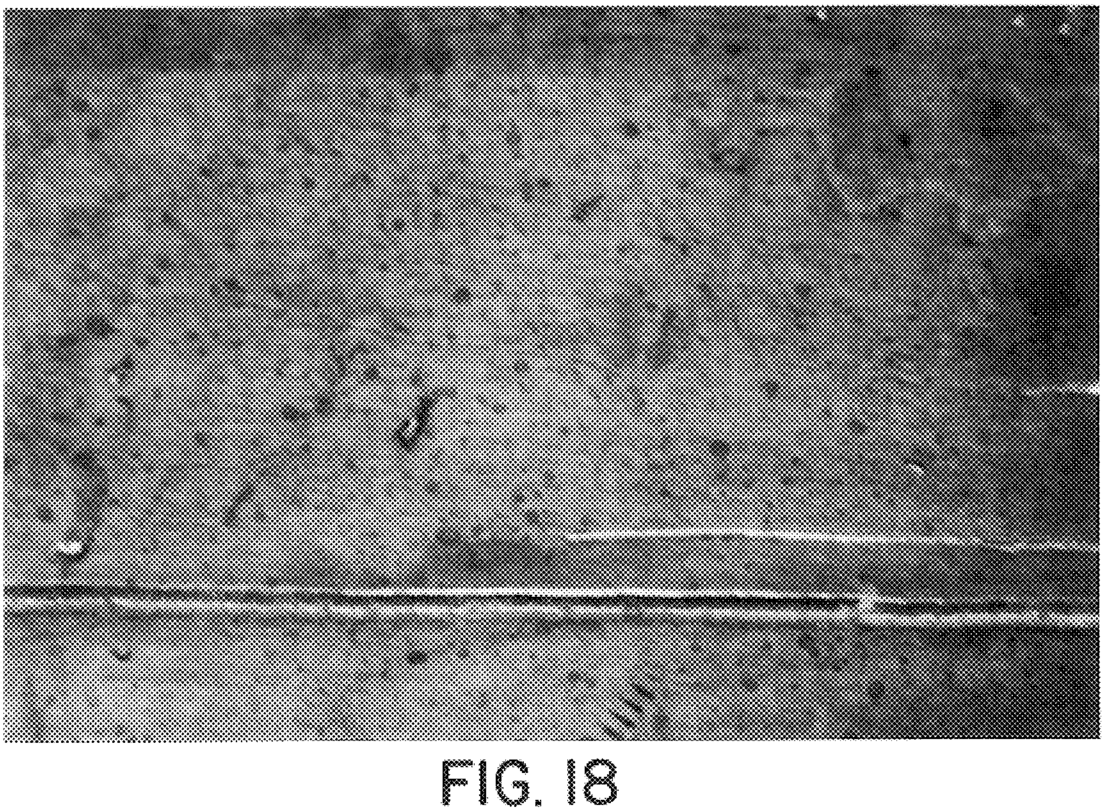
FIG. 18 shows a surface of a furniture part with surface texturing produced according to a preferred embodiment of the invention including uneven cut lines across the center of the figure.

FIG. 14 illustrates a router bit 92 in contact with the furniture part 204 such that a longitudinal axis 210 of the distressing router 90 forms an angle 212 with the surface of the furniture part 204. For the particular router bit 92 depicted in FIG. 14, an angle 212 of approximately 30° is suitable. An angle 213 of approximate 75° is suitable for the cutting edge. The user selects a second point on the surface of the furniture part 204 with a depth of penetration of the bit 92 into the surface of the wood part 204 similar to or the same as that depicted in FIG. 14 and selects a linear interpolation between the two points to produce a substantially straight line such as that shown as a horizontal dark line in FIG. 15. In addition, uneven vein lines, or cut lines, can be produced in a similar manner by selecting different penetration depths of the bit 92 into the surface of the furniture part 204 at the different selected points, or selecting nonlinear interpolation between the points, selecting a plurality of points with nonuniform depths of penetration of the bit 92 into the furniture part 204 or which are not precisely along a single line, or some combination of these or other factors. FIG. 16 shows an example of an uneven cut line across the center of the figure. This type of distress mark simulates markings which would be produced in handcrafted furniture. FIGS. 17 and 18 show additional examples of uneven cut or vein lines. The depth of the cut lines is selectable for the router bit 92, and other router bits may be selected. A typical depth of such a cut may be between 1 and 4 mm.

Figure 19:
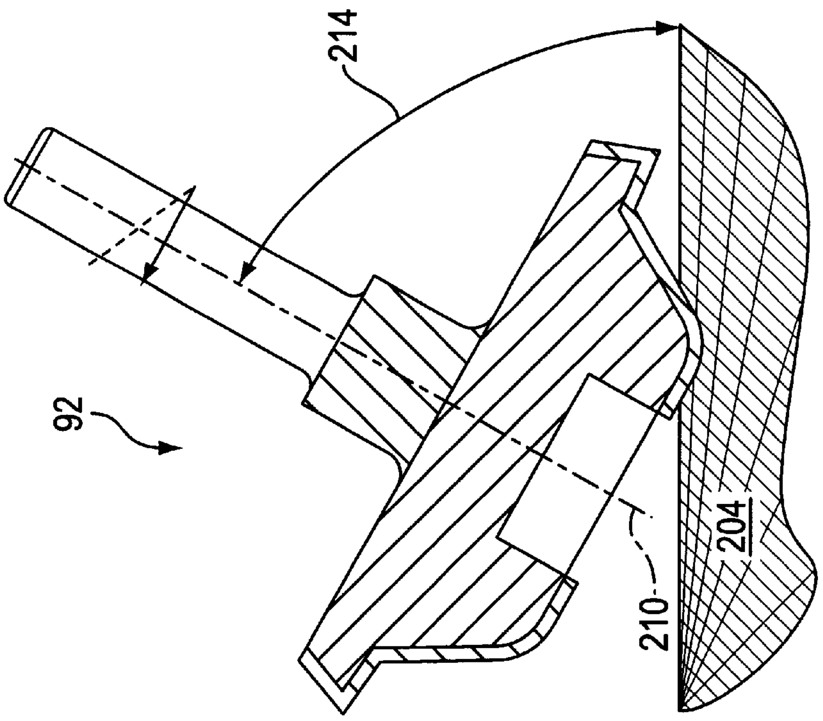
FIG. 19 is a view of a router bit according to a preferred embodiment of the invention illustrating the production of furniture distress marks which simulate cigarette burn marks.
Figure 20:
FIG. 20 shows a surface of a furniture part with surface texturing produced according to a preferred embodiment of the invention including simulated cigarette burn marks.

FIG. 19 illustrates an example in which the router bit 92 is brought into contact with the furniture part 204 at a different angle 214 compared to the first mentioned angle 212. For the router bit 92, an angle 214 of approximately 60° is suitable. The user may program the robot to come into contact with the furniture part 204 as illustrated in FIG. 19 in order to simulate cigarette burn marks. In this case, the router produces an indentation in the surface of the furniture part 204 which is approximately 3–7 cm long such that the center of the indentation is deeper than the edges. Such a simulated cigarette burn mark is illustrated in the upper left hand corner of FIG. 20. Although the above description of the use of the distressing router 90 refers to producing simulated uneven vein lines, uneven plank cut lines or cigarette burn marks, it is not limited to producing only those types of distress marks.

Figure 21:
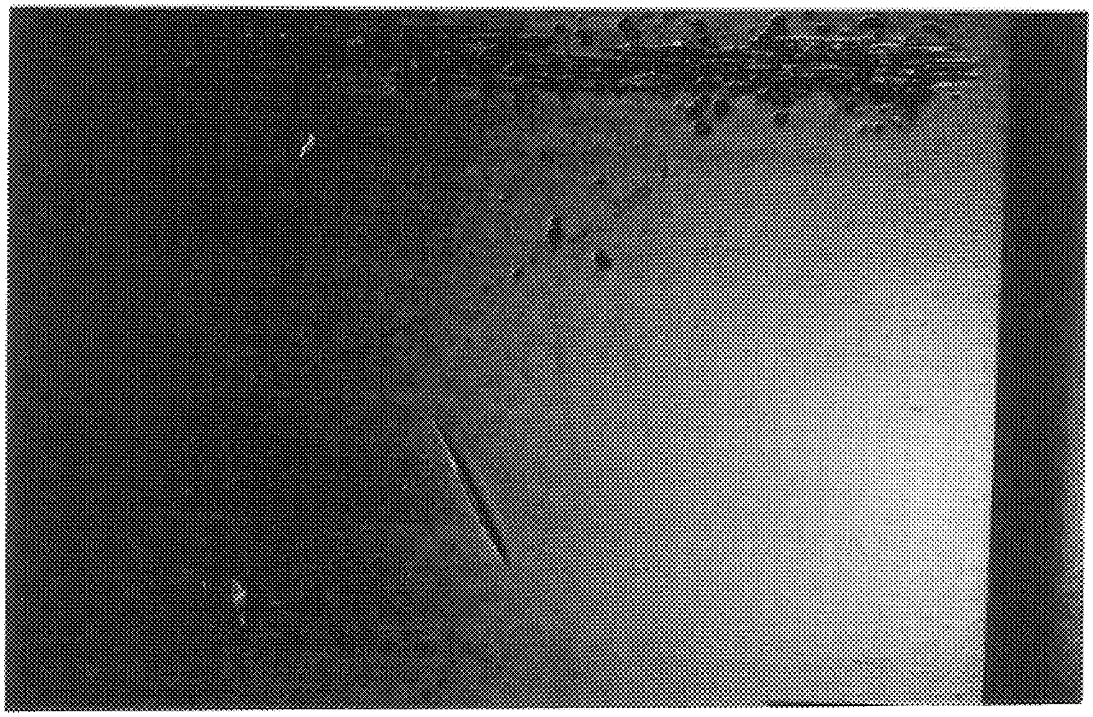
FIG. 21 shows a surface of a furniture part with surface texturing produced according to a preferred embodiment of the invention including simulated hatchet distress marks.
Figure 22:
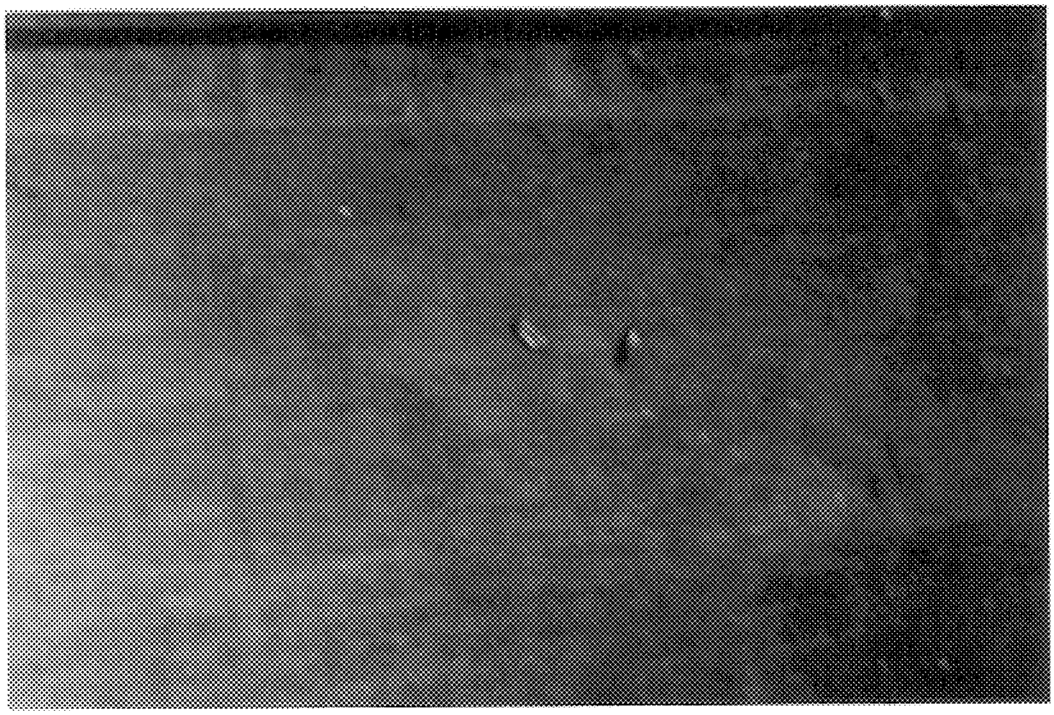
FIG. 22 shows a surface of a furniture part with surface texturing produced according to a preferred embodiment of the invention including simulated hatchet distress marks.

The distressing hatchet 114, illustrated in FIG. 3, is used to produce a plurality of furniture distress marks. In order to produce distress marks which simulate a hatchet mark, the furniture texturing robot 51 is positioned such that the hatchet is above, or proximate to, a point on the furniture part 204. The distance of the hatchet above the furniture part 204 is selected such that an impulse from the expansion component 116 forces the piston 120 (FIG. 6) and the hatchet blade 124 into the surface of the furniture part 204 to the desired depth. The user, during the programming step, can select the desired angle between the distressing hatchet 124 and the furniture part 204. Typical simulated hatchet distress marks in which the distressing hatchet 124 impacts the surface of the furniture part 204 at nearly orthogonal angles are shown in FIGS. 17, 21 and 22.

The user may also program the furniture texturing robot 51 such that the distressing hatchet 114 produces simulated wood split marks. In this case, the expansion component 116 does not provide an impulse to the distressing hatchet 124. Instead, the blade of the distressing hatchet 124 is brought into contact with the surface of the furniture part 204. Typically, a corner of the hatchet blade is brought into contact with the surface of the furniture part 204. The user then programs the robot such that the hatchet is drawn across the surface of the furniture part 204 substantially in a straight line motion which is substantially parallel to the surface of the furniture part 204. Examples of such distress marks are the two shorter distress lines shown in FIG. 18. Although the specification describes the use of the hatchet distressing tool 114 to simulate hatchet marks or wood split marks, the invention is not limited to producing only those types of simulated furniture distress marks with the hatchet distressing tool 114.

The user can program the rock distressing tool 112 to produce a plurality of the furniture distress marks. The surface 134 of the distressing rock 130 has a plurality of concave and convex regions. This results in portions which protrude relative to other portions of the surface. These protrusions are selectable in a great variety of forms since they can be used to simulate distress marks produced by rocks, and actual rocks have a great variety of surface features. The user positions the furniture texturing robot 51 such that a desired portion of the distressing rock 130 surface 134 is proximate to, and above, a region of the furniture part 204 in which the user desires to produce a simulated rock distress mark. The furniture texturing robot 51 is programmed such that the expansion component 127 delivers an impulse to the rock 130 by means of the piston 128 and rock spacer 132, so as to thrust the surface 134 of the distressing rock 130 into the surface of the furniture part 204. The height of the rock distressing tool 112 is selected so as to produce a desired depth of penetration of the rock surface 134 into the surface of the furniture part 204. Typical penetration depths are 1–4 mm. The user can further select various angles of orientation of the rock distressing tool 112 relative to the surface of the furniture part 204 to produce different rock distress marks. Consequently, a single distressing rock 130 with a plurality of concave and convex surface regions 134 can produce a plurality of simulated rock distress marks. The lower left hand corner of FIG. 21 shows an example of a rock distress mark. The center of FIG. 22 shows another example of a rock distress mark. Although the specification describes programming the furniture texturing robot 51 such that it produces a plurality of simulated rock distress marks with the rock distressing tool 112, the invention is not limited to only simulating rock distress marks with the rock distressing tool 112.

Figure 23:
FIG. 23 shows a surface of a furniture part with surface texturing produced according to a preferred embodiment of the invention including wormhole distress marks.

The user can program the furniture texturing robot 51 to produce a plurality of furniture distress marks with the descalar distressing tool 110 (see FIG. 3). To produce distress marks which simulate worm hole marks, the user positions the furniture texturing robot 51 such that the descalar pins 140 are oriented such that their longitudinal axis is substantially orthogonal to a surface region of the furniture part 204. The user programs the furniture texturing robot 51 such that the descalar pins 140 are thrust into the surface of the furniture part 204 by the descalar piston. The user programs the furniture texturing robot 51 such that the descalar pins 140 move quickly into proximity with the surface of the furniture part 204 and then out of proximity of the furniture part 204. This process is repeated at predetermined rarefied locations, so as to simulate a random pattern of rarefied and approximately circular wormhole distress marks. This sequence results in the descalar appearing to hop randomly about the surface of the furniture part 204. FIG. 16 shows an example of such wormhole furniture distress marks in the upper right hand corner. FIG. 23 shows another example of wormhole distress marks along with other types of distress marks. A typical wormhole distress mark is approximately a millimeter deep and approximately circular in shape. The user may also program the robot such that the descalar pins 140 come into contact with the surface of the furniture part 204 at angles less than 90° so as to produce oblong or elliptical shaped wormhole marks.

Figure 24:
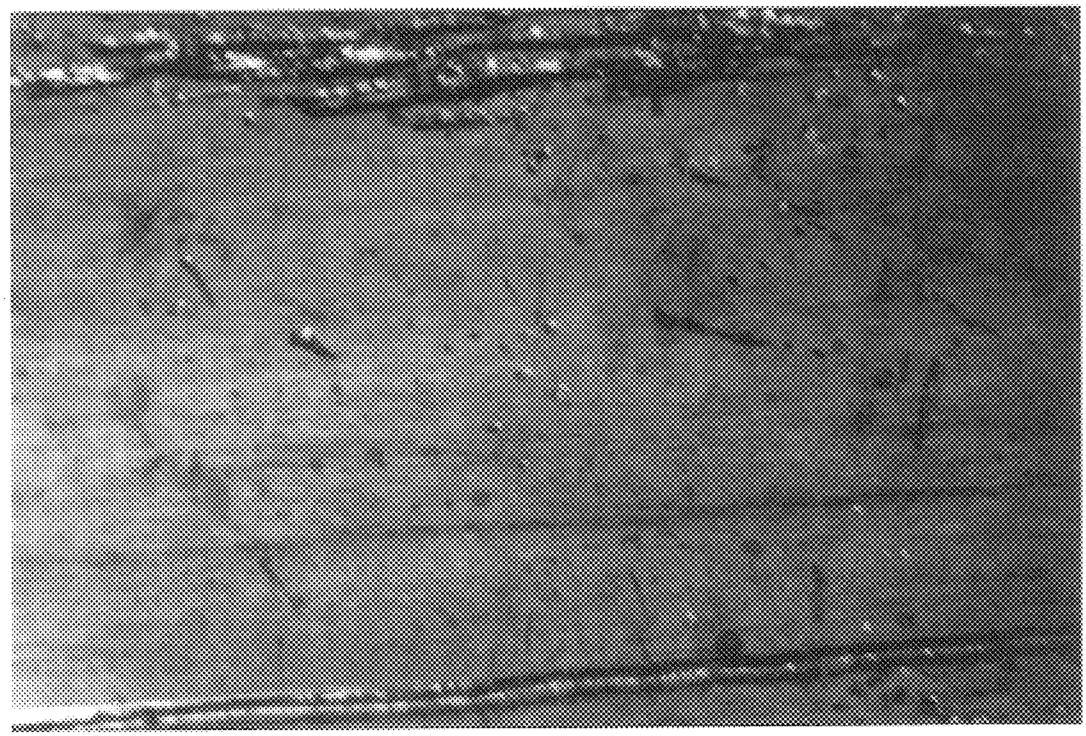
FIG. 24 shows a surface of a furniture part with surface texturing produced according to a preferred embodiment of the invention including wormhole distress marks.
Figure 25:
FIG. 25 shows a surface of a furniture part with surface texturing produced according to a preferred embodiment of the invention including simulated wood rot distress marks.
Figure 26:
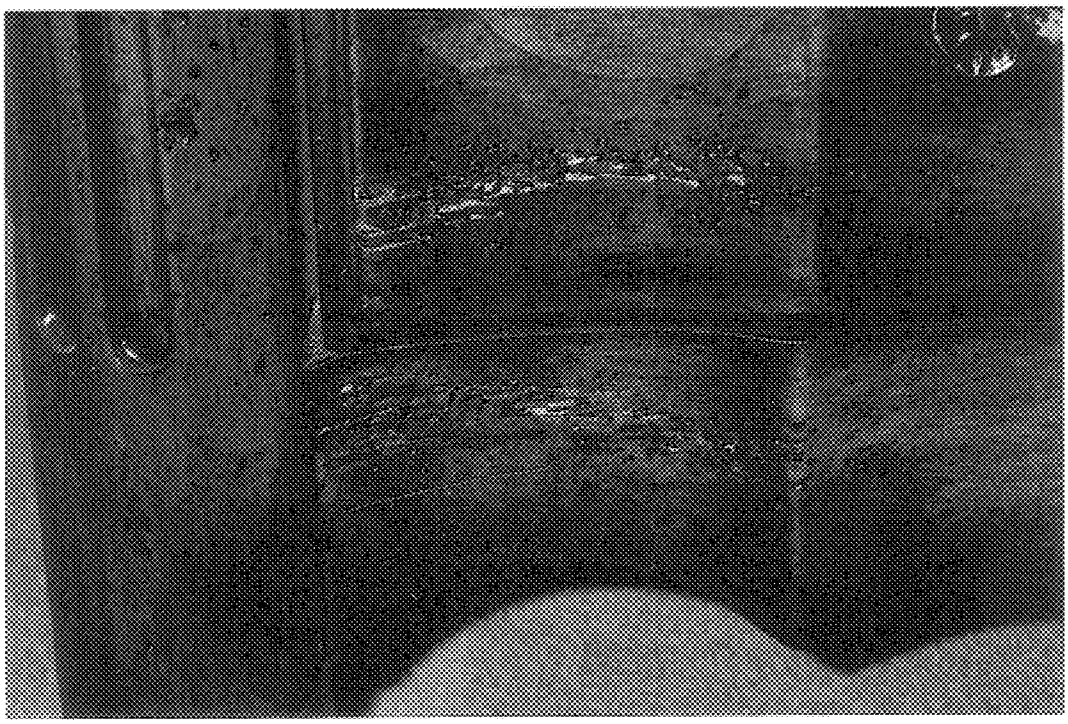
FIG. 26 shows a surface of a furniture part with surface texturing produced according to a preferred embodiment of the invention including simulated wood rot distress marks.
Figure 27:
FIG. 27 shows an example of furniture chatter marks according to a preferred embodiment of the invention.
Figure 28:
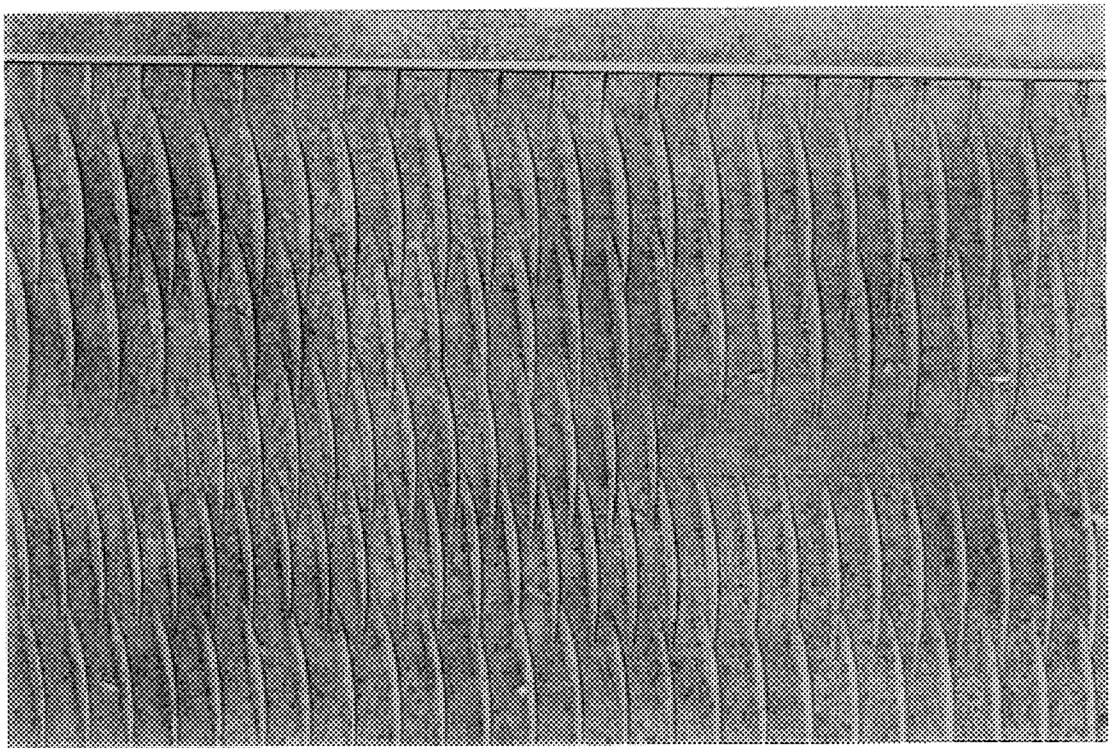
FIG. 28 shows an example of furniture chatter marks according to a preferred embodiment of the invention.
Figure 29:
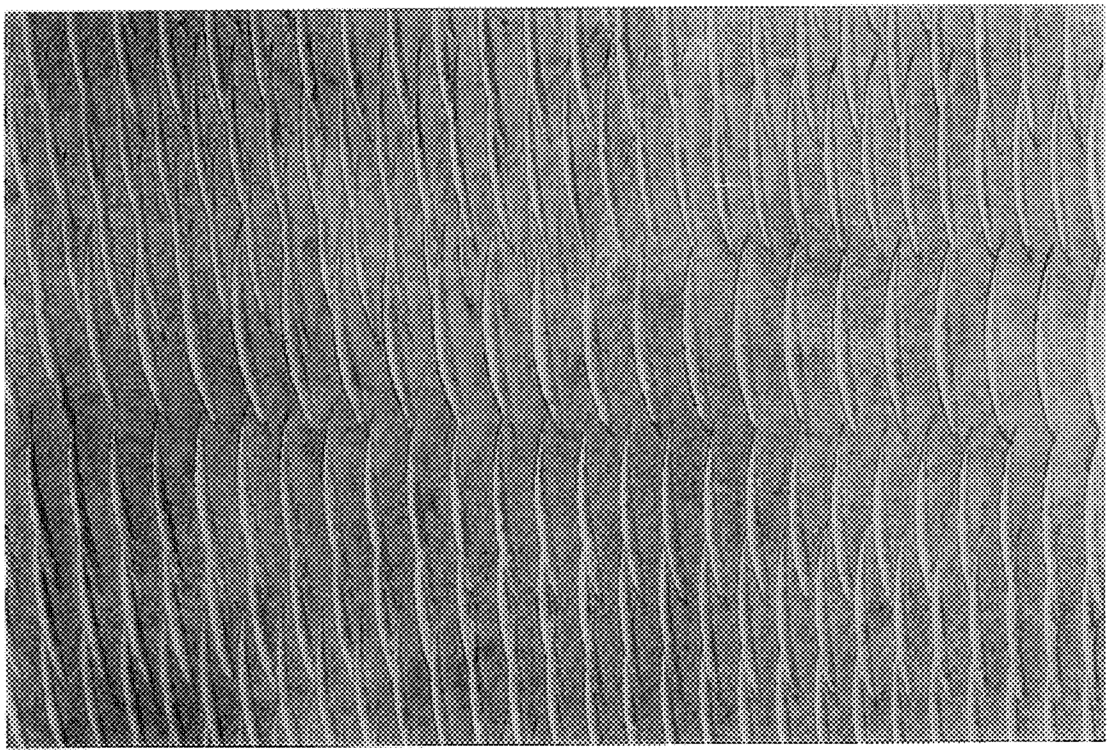
FIG. 29 shows an example of furniture chatter marks according to a preferred embodiment of the invention.
Figure 30:
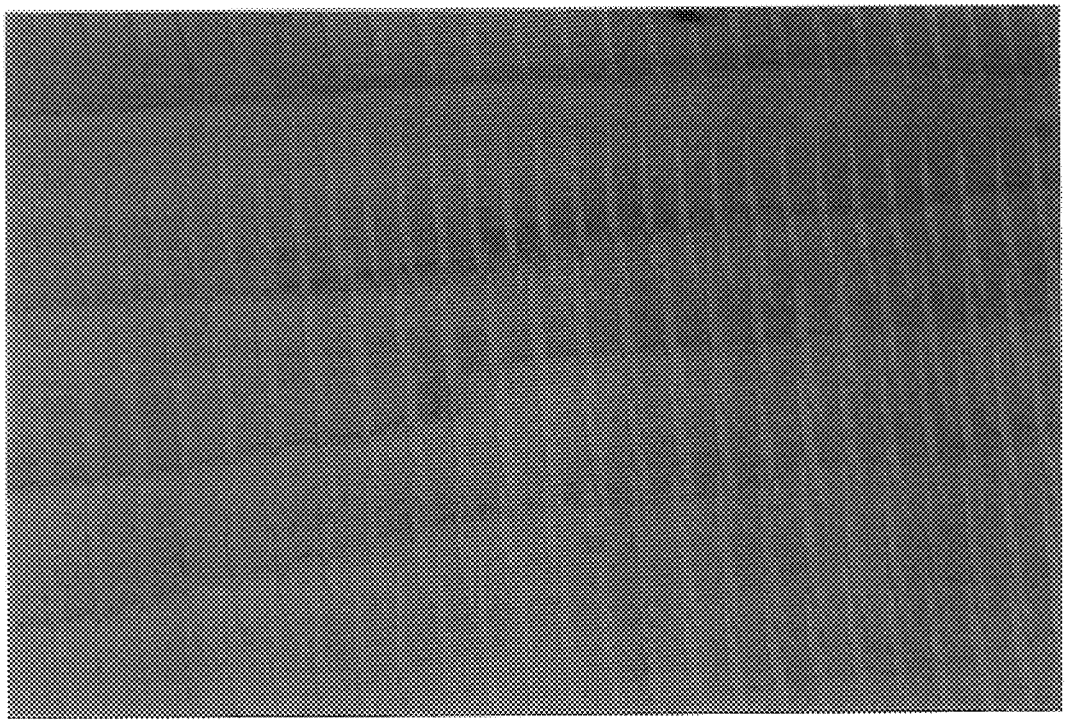
FIG. 30 shows an example of furniture chatter marks according to a preferred embodiment of the invention.
Figure 31:
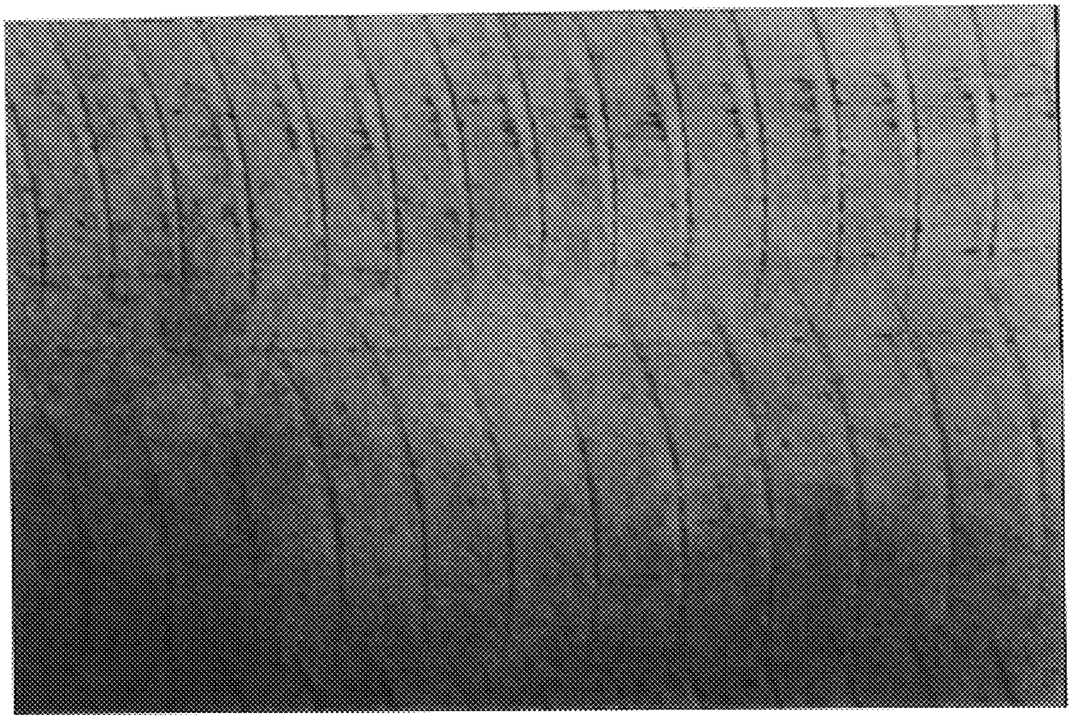
FIG. 31 shows an example of furniture chatter marks according to a preferred embodiment of the invention.
Figure 32:
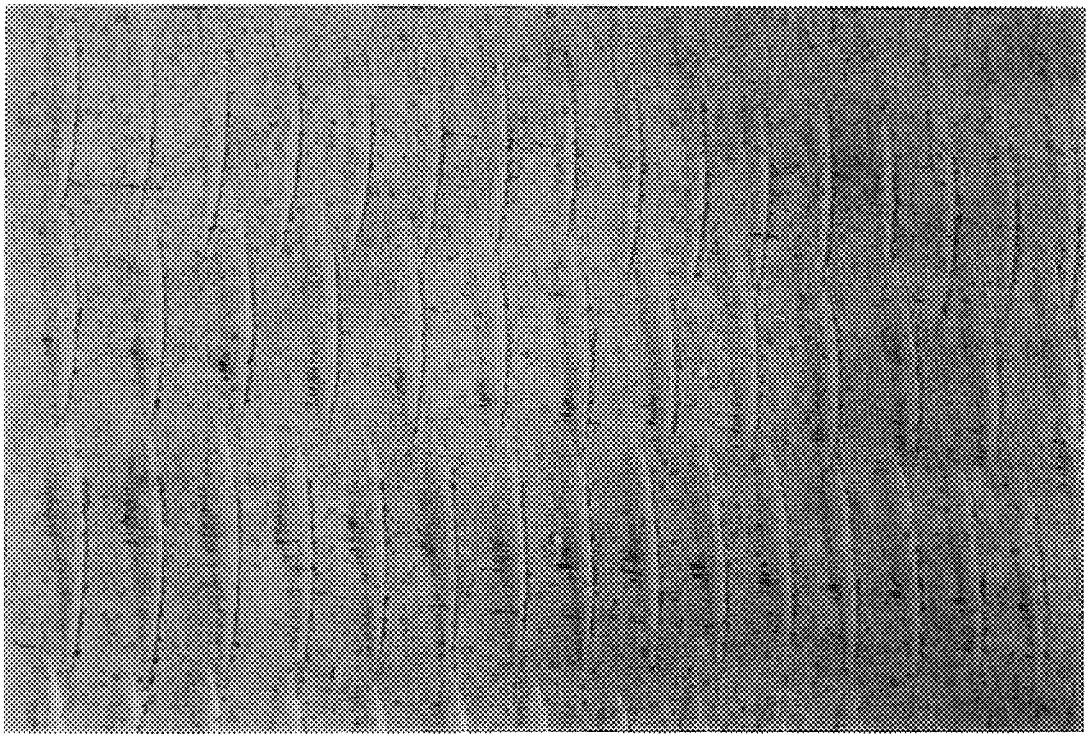
FIG. 32 shows an example of furniture chatter marks according to a preferred embodiment of the invention.
Figure 33:
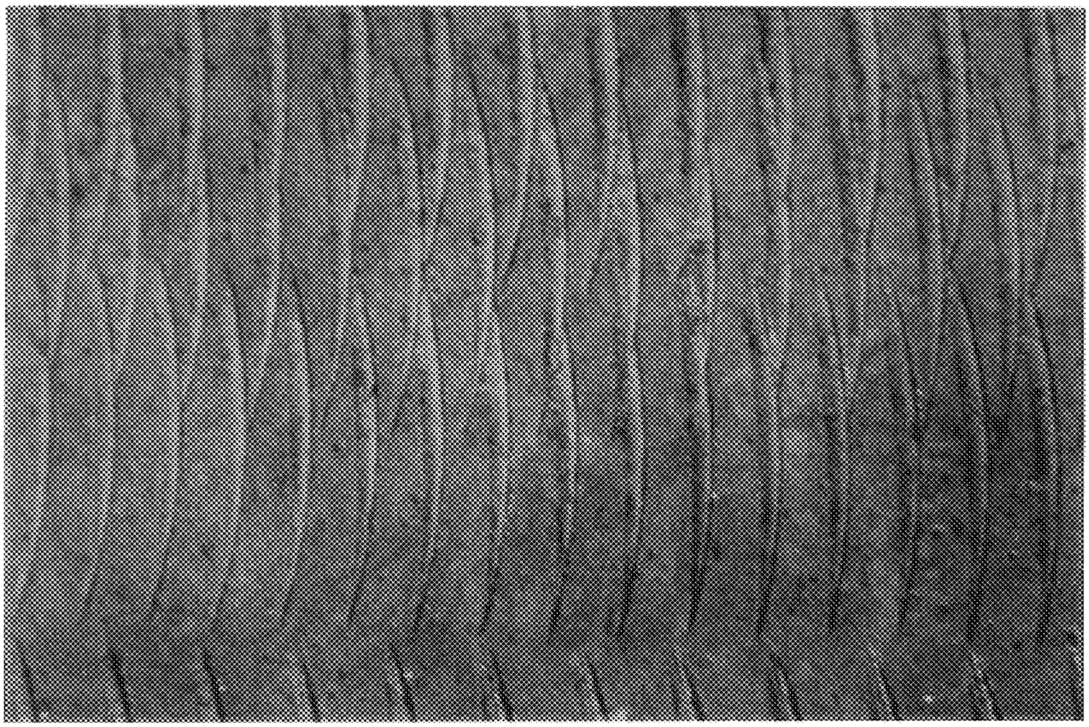
FIG. 33 shows an example of furniture chatter marks according to a preferred embodiment of the invention.
Figure 34:
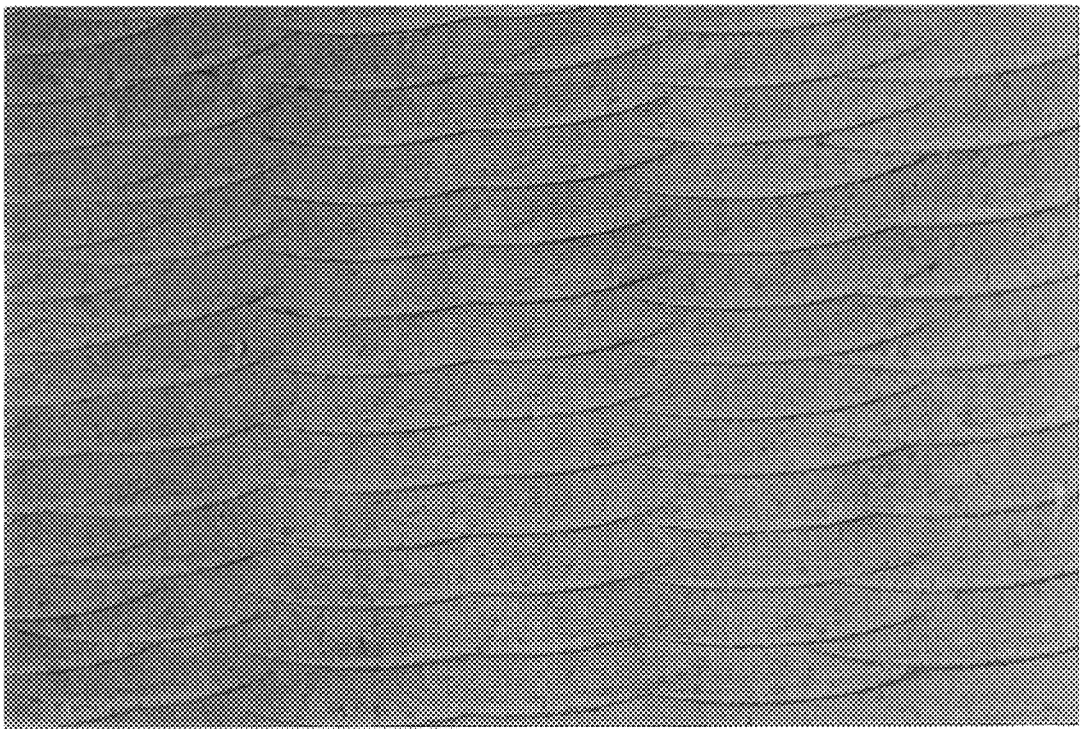
FIG. 34 shows an example of furniture chatter marks according to a preferred embodiment of the invention.
Figure 35:
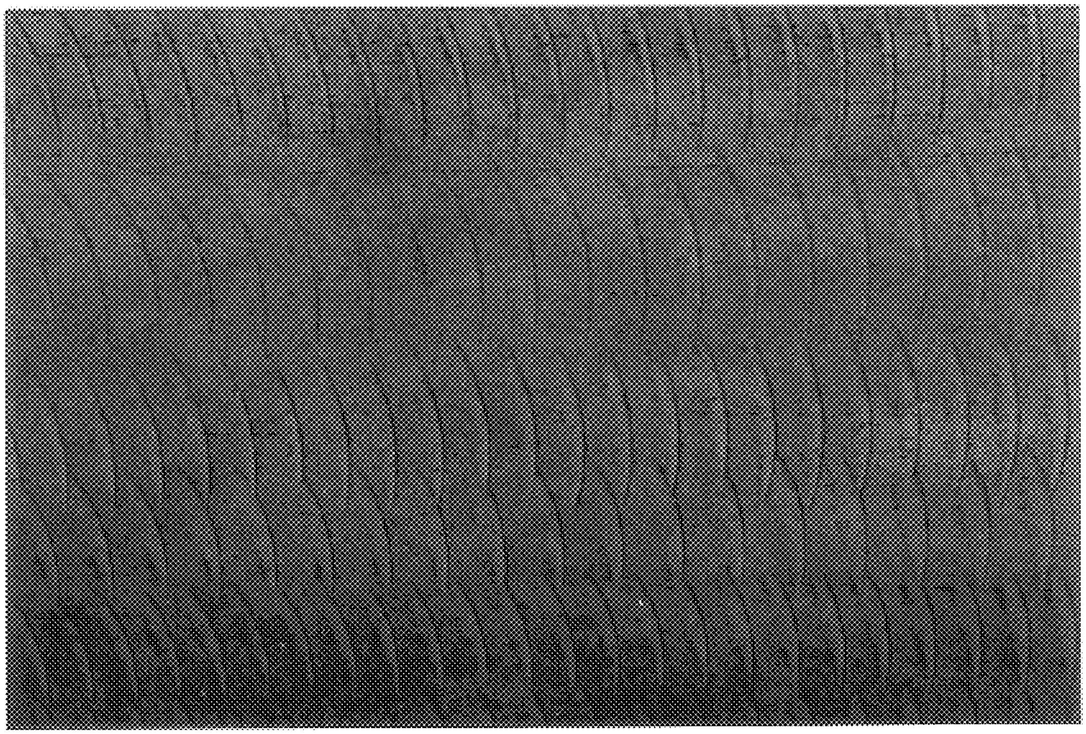
FIG. 35 shows an example of furniture chatter marks according to a preferred embodiment of the invention.
Figure 36:
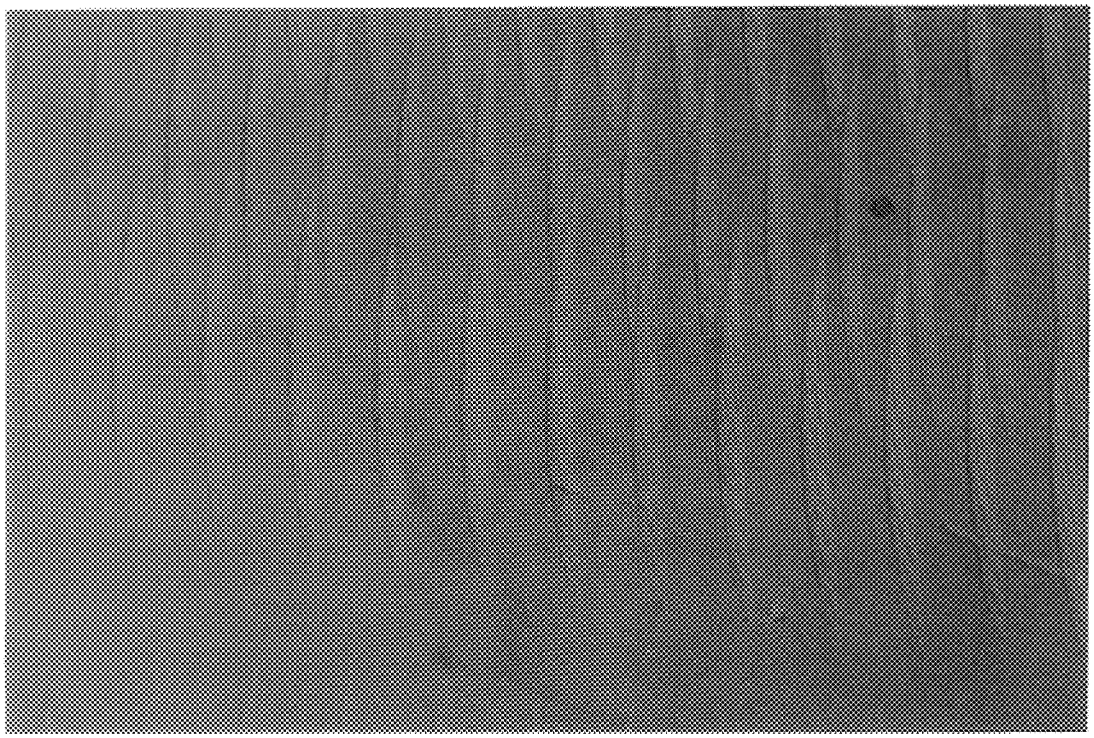
FIG. 36 shows an example of furniture chatter marks according to a preferred embodiment of the invention.
Figure 37:
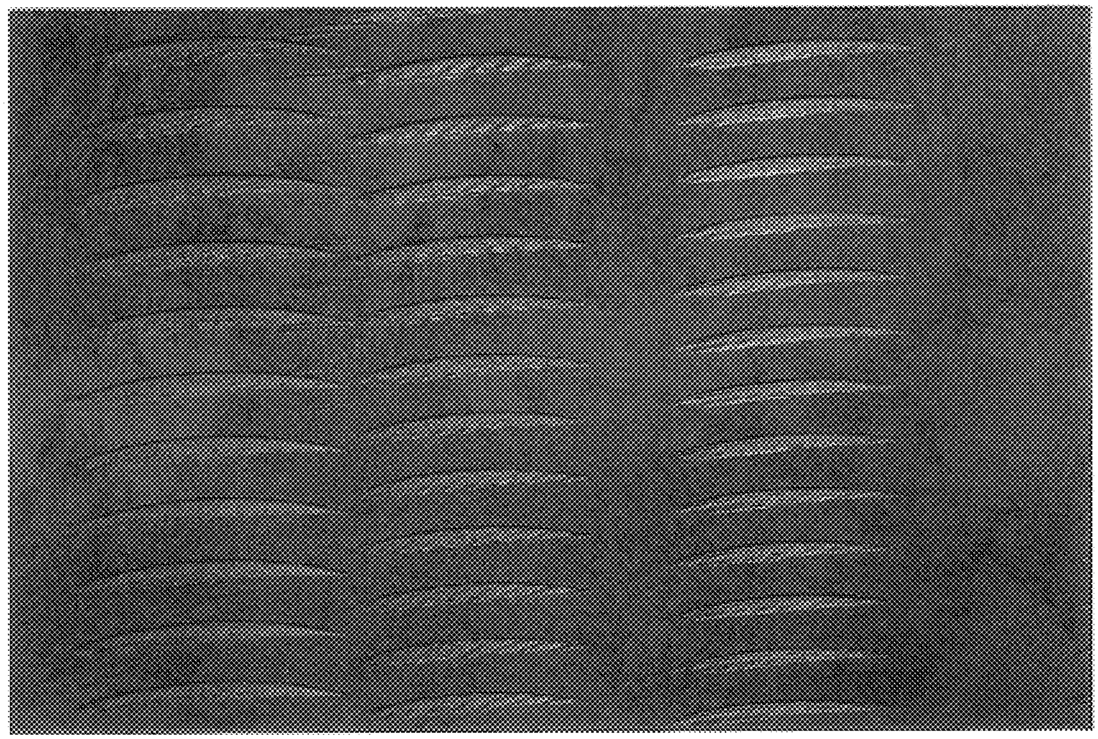
FIG. 37 shows an example of furniture chatter marks according to a preferred embodiment of the invention.

The user may also program the furniture texturing robot 51 to produce simulated wood rot marks with the descalar distressing tool 110. In this case, the user programs the furniture texturing robot 51 such that the descalar pins 144 come into contact with the furniture part 204 in a highly concentrated region and typically at very shallow angles of the longitudinal axis of the descalar pins relative to the surface of the furniture part 204. The upper edge of FIG. 24 illustrates the simulated wood rot furniture distress marks. FIG. 24 includes other types of distress marks such as a random pattern of wormhole marks and an uneven cut mark across the bottom. FIGS. 21, 25 and 26 provide further examples of simulated wood rot distress marks produced according to this invention. Although the specification describes simulating wormhole distress marks and wood rot distress marks using the descalar distressing tool 110, it is not limited to producing only these types of distress marks with the descalar distressing tool.

The user selects the furniture chattering tool unit 154, illustrated in FIGS. 12 and 13, and attaches it to the attachment plate 64 of the programmable multiaxis robot 52, if the user desires to program the furniture texturing robot 51 to produce chattering texture marks according to the preferred embodiment. The user adjusts the roller bearing unit 196 such that the roller bearing 200 comes into contact with the surface of the furniture part 204 after the saw blade 194 has penetrated the surface of the furniture part 204 to a desired depth. The user then programs the robot such that the saw blade 194 has a desired angle of incidence with the surface of the furniture part 204. Selecting different angles of incidence or depths of cutting, provide different chattering effects. The user programs the robot to drag the furniture chattering tool unit 154 across a predetermined region of the surface of the furniture part 204. The user may select to program the furniture texturing robot 51 to produce a substantially uniform chattering pattern across the surface of the furniture part 204, or may vary the chattering path, saw blade angle and depth of cutting at different regions of the surface of the furniture part 204. The maximum depth of a chatter mark relative to the adjacent minimum depth is typically one to a few millimeters. The user may program the furniture texturing robot 51 to produce predetermined furniture chattering marks which appear to be random and others which cannot reasonably be produced by known methods.

In a case in which the surface of the furniture part 204 is a curved surface, the user must exercise a great amount of care in programming the furniture texturing robot 51 such that the saw blade 194 makes the desired angle of contact with each desired point of the curved surface of the furniture part 204. FIGS. 27–37 show a variety of furniture chattering marks which one may produce with the furniture texturing robotic system of this invention. However, this invention is not limited to producing only the predetermined chattering marks shown in the examples of FIGS. 27–37.

One skilled in the art would recognize that the programmable furniture texturing robotic system of this invention is not limited to only the specific robot described, the specific furniture texturing units described in detail, and the specific table. The invention is not limited to the two furniture texturing tool units described in detail nor to the specific tools, methods of texturing furniture, nor only the specific examples of textured furniture of the preferred embodiments.

Although the invention has been described with reference to specific embodiments, one should realize that these embodiments are illustrative of the application of the principles of the invention. One skilled in the art should recognize that modifications and rearrangements of the above illustrated preferred embodiments may be made without departing from the spirit and scope of the invention.

We claim:

1. A furniture distressing tool unit for a furniture texturing robot, comprising:

a multitool turret having a tool arm attachment region constructed and arranged such that said multitool turret is attachable to and detachable from a tool end of a tool arm of said furniture texturing robot, wherein said multitool turret has a plurality of furniture distressing tool attachment regions; and a first furniture distressing tool attached to said multitool turret at a first furniture distressing tool attachment region of said plurality of furniture distressing tool attachment regions.

2. A furniture distressing tool unit for a furniture texturing robot according to claim 1, further comprising:

a compound furniture distressing tool attachment bracket attached to said multitool turret at a second furniture tool attachment region of said plurality of furniture distressing tool attachment regions, wherein said compound furniture distressing tool bracket has a plurality of compound bracket furniture distressing tool attachment regions.

3. A furniture distressing tool unit for a furniture texturing robot according to claim 2, further comprising second, third, and fourth furniture distressing tools attached to first, second and third compound bracket furniture distressing tool attachment regions of said plurality of compound bracket furniture distressing tool attachment regions.

4. A furniture distressing tool unit for a furniture texturing robot according to claim 3, wherein said first furniture distressing tool is a router distressing tool having a selectable router bit to selectively produce a first plurality of furniture distress marks, said second furniture distressing tool is a descalar distressing tool including a descalar and having first and second descalar pins pivotally attached to said descalar to selectively produce a second plurality of furniture distress marks, said third furniture distressing tool is a rock distressing tool having a distressing rock with a plurality of convex and concave surface regions and is attached to a first slidable member which is in contact with a first expansion component such that an impulse applied by said first expansion component to said first slidable member thrusts said distressing rock into a furniture part to selectively produce a third plurality of furniture distress marks, and said fourth furniture distressing tool is a hatchet distressing tool having a distressing hatchet attached to a second slidable member which is in contact with a second expansion component such that an impulse applied by said second expansion component to said second slidable member thrusts said distressing hatchet into said furniture part to selectively produce a fourth plurality of furniture distress marks.

5. A furniture chattering tool unit for a furniture texturing robot, comprising:

a support frame having an attachment region which is attachable to and detachable from a tool end of an arm of said furniture texturing robot;

a motor attached to said support frame such that a drive shaft of said motor extends in a direction from an attachment end of said support frame to a furniture part end of said support frame such that a longitudinal axis of said drive shaft is substantially orthogonal to said attachment region of said support frame; and a chattering saw blade fixed to said drive shaft substantially at a center point of said saw blade and substantially orthogonal to said longitudinal axis of said drive shaft, wherein said blade rotates as said drive shaft rotates.

6. A furniture chattering tool unit for a furniture texturing robot according to claim 5, wherein said support frame has an upper frame portion which includes said attachment region and a lower frame portion slidably attached to said upper frame portion.

7. A furniture chattering tool unit for a furniture texturing robot according to claim 6, further comprising:

a roller bearing unit fixed to said furniture part end of said support frame, said roller bearing unit extending substantially parallel to said drive shaft of said motor and having a roller bearing at a furniture part end of said roller bearing unit, wherein a position of said roller bearing unit relative to said chattering saw blade is selectable to set a cutting depth of said chattering saw blade.

8. A furniture chattering tool unit for a furniture texturing robot according to claim 7, further comprising:

a plurality of compression springs disposed between and in contact with a top surface of said motor and an inside surface of said upper frame portion thereby providing a force on said motor and a reaction force on said lower support frame portion while said compression springs are in a nonrelaxed state;

a first gas shock disposed on a lateral side of said support frame having one end attached to said upper support frame and an opposing end attached to said lower support frame;

a second gas shock disposed on a lateral side of said support frame opposing said first gas shock having one end attached to said upper support frame and an opposing end attached to said lower support frame, said first and second gas shocks thereby damping rapid changes in and defining a maximum extent of a separation distance between said upper support frame relative to said lower support frame; and an expansion spring with an end attached to said upper support frame and an opposing end attached to said lower support frame to provide a force opposing a force directed to decrease said separation distance between said upper support frame and said lower support frame.

9. A furniture distressing tool for a furniture texturing robot comprising:

an attachment region for attaching said furniture distressing tool to a multitool turret;

a multitool turret having a tool arm attachment region constructed and arranged such that said multitool turret is attachable to and detachable from a tool end of a tool arm of said furniture texturing robot, wherein said multitool turret has a plurality of furniture distressing tool attachment regions; and a furniture distressing end which produces furniture distress marks on a furniture part.

10. A furniture distressing tool for a furniture texturing robot according to claim 9, wherein said furniture distressing tool is a router distressing tool.

11. A furniture distressing tool for a furniture texturing robot according to claim 9, wherein said furniture distressing tool is a rock distressing tool.

12. A furniture distressing tool for a furniture texturing robot according to claim 9, wherein said furniture distressing tool is a descalar distressing tool.

13. A furniture distressing tool for a furniture texturing robot according to claim 9, wherein said furniture distressing tool is a hatchet distressing tool.

* * * * *